United States Patent [19]

Tsujimura et al.

[11] Patent Number: 6,009,233

[45] Date of Patent: *Dec. 28, 1999

[54] APPARATUS AND METHOD FOR RECORDING AND REPRODUCING A VIDEO SIGNAL WITH CAMERA SETTING DATA

[75] Inventors: Takashi Tsujimura, Kanagawa; Terumasa Funabashi, Saitama; Chihiro Kaihatsu, Kanagawa, all of Japan

[73] Assignee: Sony Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/697,456

[22] Filed: Aug. 23, 1996

[30] Foreign Application Priority Data

Aug. 31, 1995 [JP] Japan .................................. 7-224406

[51] Int. Cl.[6] .............................. H04N 5/91; H04N 5/928
[52] U.S. Cl. ............................................. 386/95; 386/107
[58] Field of Search ............................ 386/95, 107, 117, 386/118, 46–38; 348/207, 208, 213, 222, 232, 262

[56] References Cited

U.S. PATENT DOCUMENTS

| | | | |
|---|---|---|---|
| 3,736,849 | 6/1973 | Thompson | 386/118 |
| 3,843,956 | 10/1974 | Kauneckas | 386/107 |
| 5,270,831 | 12/1993 | Parulski et al. | |
| 5,386,117 | 1/1995 | Piety et al. | 250/330 |
| 5,477,264 | 12/1995 | Sarbadhikari et al. | 348/222 |
| 5,627,616 | 5/1997 | Sergeant et al. | 354/81 |

*Primary Examiner*—Robert Chevalier
*Attorney, Agent, or Firm*—Frommer, Lawrence & Haug, LLP.; William S. Frommer

[57] ABSTRACT

A camera having a digital video tape recorder integrated therein establishes various camera settings in preparation of imaging a video image, images the video image so as to produce a video signal, generates camera setting data which identifies the various camera settings (e.g., iris setting, shutter speed, white balance mode and focusing mode) that were established for imaging the video image, and records the video signal in a first location of a track on a record medium, e.g., a magnetic tape, and records the camera setting data in a second location of the track on the record medium. When the video signal and camera setting data are reproduced from the record medium, display data is generated from the reproduced camera setting data and is output along with the video signal so as to allow a user to modify (i.e., process) the video signal using the stored camera setting data.

33 Claims, 34 Drawing Sheets

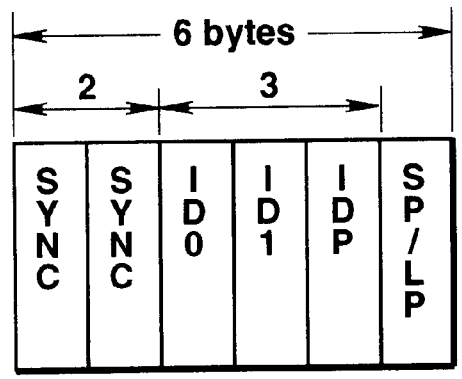
FIG.5A PRE SYNC BLOCK
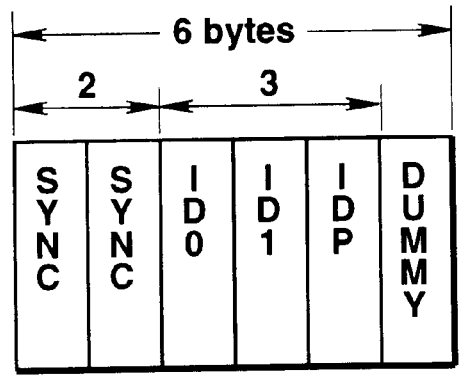
FIG.5B POST SYNC BLOCK

|  | ID 0 | ID 1 |
|---|---|---|
| MSB | SEQ 3 | SYNC 7 |
|  | SEQ 2 | SYNC 6 |
|  | SEQ 1 | SYNC 5 |
|  | SEQ 0 | SYNC 4 |
|  | TRACK 3 | SYNC 3 |
|  | TRACK 2 | SYNC 2 |
|  | TRACK 1 | SYNC 1 |
| LSB | TRACK 0 | SYNC 0 |

AAUX+AUDIO SYNC, VIDEO SYNC.

FIG.11A

|  | ID 0 | ID 1 |
|---|---|---|
| MSB | AP1/AP2 2 | SYNC 7 |
|  | AP1/AP2 1 | SYNC 6 |
|  | AP1/AP2 0 | SYNC 5 |
|  | SEQ 0 | SYNC 4 |
|  | TRACK 3 | SYNC 3 |
|  | TRACK 2 | SYNC 2 |
|  | TRACK 1 | SYNC 1 |
| LSB | TRACK 0 | SYNC 0 |

PRE SYNC, POST SYNC, C2 PARITY SYNC.

FIG.11B

| WORD NAME | | MSB | | | LSB |
|---|---|---|---|---|---|
| PC0 | (ITEM) | | | | |
| PC1 | (DATA) | | | | |
| PC2 | | | | | |
| PC3 | | | | | |
| PC4 | | | | | |

| MSB | LSB | |
|---|---|---|
| UPPER | LOWER | |
| 0 0 0 0 | x x x x | CONTROL |
| 0 0 0 1 | x x x x | TITLE |
| 0 0 1 0 | x x x x | CHAPTER |
| 0 0 1 1 | x x x x | PART |
| 0 1 0 0 | x x x x | PROGRAM |
| 0 1 0 1 | x x x x | AAUX |
| 0 1 1 0 | x x x x | VAUX |
| 0 1 1 1 | x x x x | CAMERA |
| 1 0 0 0 | x x x x | LINE |
| 1 0 0 1 | x x x x | RESERVED |
| 1 1 1 0 | x x x x | |
| 1 1 1 1 | a a a a | SOFT MODE |
| 1 1 1 1 | 1 1 1 1 | NO INFORMATION | a a a a : 0 0 0 0 ~ 1 1 1 0
x x x x : 0 0 0 0 ~ 1 1 1 1

AAUX SOURCE

| | MSB | | | | | | | LSB |
|---|---|---|---|---|---|---|---|---|
| PC0 | 0 | 1 | 0 | 1 | 0 | 0 | 0 | 0 |
| PC1 | LF | 1 | AF SIZE | | | | | |
| PC2 | CH | | | PA | AUDIO MODE | | | |
| PC3 | 1 | 1 | 50/60 | STYPE | | | | |
| PC4 | EF | TC | SMP | | | QU | | |

FIG. 15B

AAUX SOURCE CONTROL

| | MSB | | | | | | | LSB |
|---|---|---|---|---|---|---|---|---|
| PC0 | 0 | 1 | 0 | 1 | 0 | 0 | 0 | 1 |
| PC1 | SCMS | | COPY SOUR. | | COPY GENE. | | CP | CI |
| PC2 | REC ST. | REC E. | REC MODE | | 1 | 1 | 1 | 1 |
| PC3 | DRF | SPEED | | | | | | |
| PC4 | 1 | GENRE CATEGORY | | | | | | |

REC ST. : RECORDING START FRAME
REC E. : RECORDING END FRAME

FIG. 15C

AAUX REC DATE

| | MSB | | | | | | | LSB |
|---|---|---|---|---|---|---|---|---|
| PC0 | 0 | 1 | 0 | 1 | 0 | 0 | 1 | 0 |
| PC1 | DS | TM | TIME ZONE | | | | | |
| PC2 | 1 | 1 | DAY | | | | | |
| PC3 | WEEK | | | MONTH | | | | |
| PC4 | YEAR | | | | | | | |

FIG. 15D

AAUX REC TIME

| | MSB | | | | | | | LSB |
|---|---|---|---|---|---|---|---|---|
| PC0 | 0 | 1 | 0 | 1 | 0 | 0 | 1 | 1 |
| PC1 | S2 | S1 | TENS OF PR. | | UNITS OF FRAMES | | | |
| PC2 | S3 | TENS OF SECONDS | | | UNITS OF SECONDS | | | |
| PC3 | S4 | TENS OF MINUTES | | | UNITS OF MINUTES | | | |
| PC4 | S6 | S5 | TENS OF H. | | UNITS OF HOURS | | | |

FIG. 15E

AAUX REC TIME BINARY GROUP

| | MSB | | | | | | | LSB |
|---|---|---|---|---|---|---|---|---|
| PC0 | 0 | 1 | 0 | 1 | 0 | 1 | 0 | 0 |
| PC1 | 2nd BINARY | | | | 1st BINARY | | | |
| PC2 | 4th BINARY | | | | 3rd BINARY | | | |
| PC3 | 6th BINARY | | | | 5th BINARY | | | |
| PC4 | 8th BINARY | | | | 7th BINARY | | | |

FIG.16A

AAUX CLOSED CAPTION

| | MSB | | | | | | | LSB |
|---|---|---|---|---|---|---|---|---|
| PC0 | 0 | 1 | 0 | 1 | 0 | 1 | 0 | 1 |
| PC1 | 1 | 1 | MAIN AUDIO LANG. | | | | MAIN AUDIO TYPE | |
| PC2 | 1 | 1 | 2ND AUDIO LANG. | | | | 2ND AUDIO TYPE | |
| PC3 | 1 | 1 | 1 | 1 | 1 | 1 | 1 | 1 |
| PC4 | 1 | 1 | 1 | 1 | 1 | 1 | 1 | 1 |

FIG.16B

VAUX SOURCE

| | MSB | | | | | | | LSB |
|---|---|---|---|---|---|---|---|---|
| PC0 | 0 | 1 | 1 | 0 | 0 | 0 | 0 | 0 |
| PC1 | TENS OF TV CHANNEL | | | | UNITS OF TV CHANNEL | | | |
| PC2 | B/W | EN | CLF | | HUNDREDS OF TV CHANNEL | | | |
| PC3 | SOURCE CODE | | 50/60 | | STYPE | | | |
| PC4 | TUNER CATEGORY | | | | | | | |

FIG.16C

VAUX SOURCE CONTROL

| | MSB | | | | | | | LSB |
|---|---|---|---|---|---|---|---|---|
| PC0 | 0 | 1 | 1 | 0 | 0 | 0 | 0 | 1 |
| PC1 | SCMS | | COPY SOUR. | | COPY GENE. | | CP | CI |
| PC2 | REC ST. | | 1 | REC MODE | | 1 | DISP | |
| PC3 | FF | FS | FC | IL | ST | SC | BCSYS | |
| PC4 | 1 | GENRE CATEGORY | | | | | | |

FIG.16D

VAUX REC DATE

| | MSB | | | | | | | LSB |
|---|---|---|---|---|---|---|---|---|
| PC0 | 0 | 1 | 1 | 0 | 0 | 0 | 1 | 0 |
| PC1 | DS | TM | TIME ZONE | | | | | |
| PC2 | 1 | 1 | DAY | | | | | |
| PC3 | WEEK | | | MONTH | | | | |
| PC4 | YEAR | | | | | | | |

FIG.16E

VAUX REC TIME

| | MSB | | | | | | | LSB |
|---|---|---|---|---|---|---|---|---|
| PC0 | 0 | 1 | 1 | 0 | 0 | 0 | 1 | 1 |
| PC1 | S2 | S1 | TENS OF FR. | | UNITS OF FRAMES | | | |
| PC2 | S3 | TENS OF SECONDS | | | UNITS OF SECONDS | | | |
| PC3 | S4 | TENS OF MINUTES | | | UNITS OF MINUTES | | | |
| PC4 | S6 | S5 | TENS OF H. | | UNITS OF HOURS | | | |

VAUX REC TIME BINARY GROUP

| | MSB | | | | | | | LSB |
|---|---|---|---|---|---|---|---|---|
| PC0 | 0 | 1 | 1 | 0 | 0 | 1 | 0 | 0 |
| PC1 | 2nd BINARY | | | | 1st BINARY | | | |
| PC2 | 4th BINARY | | | | 3rd BINARY | | | |
| PC3 | 6thBINARY | | | | 5th BINARY | | | |
| PC4 | 8th BINARY | | | | 7th BINARY | | | |

FIG.17A

VAUX CLOSED CAPTION

| | MSB | | | | | | | LSB |
|---|---|---|---|---|---|---|---|---|
| PC0 | 0 | 1 | 1 | 0 | 0 | 1 | 0 | 1 |
| PC1 | 1st FIBLD LINE 21 UPPER BYTE | | | | | | | |
| PC2 | 1st FIBLD LINE 21 LOWER BYTE | | | | | | | |
| PC3 | 2nd FIBLD LINE 21 UPPER BYTE | | | | | | | |
| PC4 | 2nd FIBLD LINE 21 LOWER BYTE | | | | | | | |

FIG.17B

[ AAUX PACK STRUCTURE ]

TRACK NO. →

| | 1 | 2 | 3 | 4 | 5 | 6 | 7 | 8 | 9 | 10 |
|---|---|---|---|---|---|---|---|---|---|---|
| 8 | 55 | | 55 | | 55 | | 55 | | 55 | |
| 7 | 54 | | 54 | | 54 | | 54 | | 54 | |
| 6 | 53 | | 53 | | 53 | | 53 | | 53 | |
| 5 | 52 | 55 | 52 | 55 | 52 | 55 | 52 | 55 | 52 | 55 |
| 4 | 51 | 54 | 51 | 54 | 51 | 54 | 51 | 54 | 51 | 54 |
| 3 | 50 | 53 | 50 | 53 | 50 | 53 | 50 | 53 | 50 | 53 |
| 2 | | 52 | | 52 | | 52 | | 52 | | 52 |
| 1 | | 51 | | 51 | | 51 | | 51 | | 51 |
| 0 | | 50 | | 50 | | 50 | | 50 | | 50 |

↑
PACK NO.

50～55 : AAUX MAIN AREA
NUMBER OF REAL DATA IN OPTIONAL AREA : 120bytes

FIG.18

| TRAC. NO. → | 0 | 1 | 2 | 3 | 4 | 5 | 6 | 7 | 8 | 9 |
|---|---|---|---|---|---|---|---|---|---|---|
| | 65 | | 65 | | 65 | | 65 | | 65 | |
| | 64 | | 64 | | 64 | | 64 | | 64 | |
| | 63 | | 63 | | 63 | | 63 | | 63 | |
| | 62 | | 62 | | 62 | | 62 | | 62 | |
| [VAUX] 40 | 61 | | 61 | | 61 | | 61 | | 61 | |
| | 60 | | 60 | | 60 | | 60 | | 60 | |

60~65: VAUX MAIN AREA

NUMBER OF REAL OPTIONAL DATA 1560 BYTE

| | 0 | 1 | 2 | 3 | 4 | 5 | 6 | 7 | 8 | 9 |
|---|---|---|---|---|---|---|---|---|---|---|
| 5 | | 65 | | 65 | | 65 | | 65 | | 65 |
| | | 64 | | 64 | | 64 | | 64 | | 64 |
| | | 63 | | 63 | | 63 | | 63 | | 63 |
| | | 62 | | 62 | | 62 | | 62 | | 62 |
| | | 61 | | 61 | | 61 | | 61 | | 61 |
| 0 | | 60 | | 60 | | 60 | | 60 | | 60 |

PACK NO.

CONSUMER CAMERA 1

|      | MSB |   |   |   |   |   |   | LSB |
|------|-----|---|---|---|---|---|---|-----|
| PC 0 | 0 | 1 | 1 | 1 | 0 | 0 | 0 | 0 |
| PC 1 | 1 | 1 | \multicolumn{6}{c} IRIS |
| PC 2 | \multicolumn{4}{c} AE MODE | \multicolumn{4}{c} AGC |
| PC 3 | \multicolumn{4}{c} WB MODE | \multicolumn{4}{c} WHITE BALANCE |
| PC 4 | FCM | \multicolumn{7}{c} FOCUS |

FIG.23

CONSUMER CAMERA 2

|      | MSB |   |   |   |   |   |   | LSB |
|------|-----|---|---|---|---|---|---|-----|
| PC 0 | 0 | 1 | 1 | 1 | 0 | 0 | 0 | 1 |
| PC 1 | 1 | 1 | VPD | \multicolumn{5}{c} V PANNING SPEED |
| PC 2 | IS | HPD | \multicolumn{6}{c} H PANNING SPEED |
| PC 3 | \multicolumn{8}{c} FOCAL LENGTH |
| PC 4 | ZEN | \multicolumn{3}{c} UNITS OF E-ZOOM | \multicolumn{4}{c} 1/10 OF E-ZOOM |

FIG.24

| | ASPECT RATIO | COPY GUARD | TITLE | SEPARATE PROGRAM | OTHERS | CLOCKS | NUMBER OF bits / FRAME |
|---|---|---|---|---|---|---|---|
| CC | ○ | | ○ | ○ | | 503kHz | 32bits |
| EDS | ○ | ○ | | ○ | ○ | 503kHz | 20bits |
| VBID | ○ | | | | ○ | Fsc/4 | 14bits |
| WSS | ○ | | | | ○ | 833kHz | |
| CHARACTER MULTIPLEXED SIGNAL | | | ○ | ○ | | 5.7272MHz | 4480bits |
| TELETEXT | | | ○ | ○ | | 6.9375MHz | 11008bits |
| MACROVISION SIGNAL | | ○ | | | | OPTIONAL | ANALOG |
| INTER-STATION CONTROL SIGNAL | | | | | ○ | OPTIONAL | ANALOG |
| BUSINESS-USE SIGNAL | | | | | ○ | NOT CLEAR | NOT CLEAR |

FIG.26

| AUDIO TYPE OF CC PACK | | AUDIO MODE OF SOURCE PACK | |
|---|---|---|---|
| MAIN | 2ND | CH 1 | CH 2 |
| 0 0 1 | 0 0 0 | 0 0 1 0 | 1 1 1 0 |
|  | 0 0 1 | 0 0 1 0 | 0 0 1 0 |
|  | 0 1 0 | 0 0 1 0 | 1 1 1 0 |
|  | 0 1 1 | 0 0 1 0 | 1 1 1 0 |
|  | 1 0 0 | 0 0 1 0 | 1 1 1 0 |
|  | 1 0 1 | 0 0 1 0 | 1 1 1 0 |
|  | 1 1 0 | 0 0 1 0 | 1 1 1 0 |
|  | 1 1 1 | 0 0 1 0 | 1 1 1 1 |

0 0 1 0 : MONO
1 1 1 0 : BEYOND DISCRIMINATION
1 1 1 1 : NO INFORMATION
CH 1 : FORMER 5 TRACKS
CH 2 : LATTER 5 TRACKS

FIG.30

| VTR NOT ADAPTABLE TO TR PACK | WRITE CC PACK IF THERE IS ANY |
|---|---|
| VTR ADAPTABLE TO TR PACK | WRITE CC PACK AND TR PACK (WRITE CC PACK AT ANY RATE IN TWO LAST TRACKS OF EACH VIDEO FRAME) |

RECORD TIME

FIG.32A

| VTR NOT ADAPTABLE TO TR PACK | IF THERE IS CC PACK, SEND IT IN SUPERPOSITION ON PRE-SET LINE |
|---|---|
| VTR ADAPTABLE TO TR PACK | IF THERE ARE CC AND TR PACKS, SECOND THEM IN SUPERPOSITION ON PRE-SET LINE |
| FOR BOTH TR PACK ADAPTABLE AND NON-ADAPTABLE VTRS, OTHER COMPOSITE VIDEO SIGNAL ANCILLARY INFORMATION FROM 60h, 61h, 50h AND 51h PACKS ||

PLAYBACK TIME

FIG.32B

| PC 0 | 0 | 1 | 1 | 0 | 0 | 1 | 1 | 0 |
|------|---|---|---|---|---|---|---|---|
| PC 1 | ←-------------- LSB | | | | 0 | 0 | 0 | 0 |
| PC 2 | -------------- VBID DATA -------------- | | | | | | | |
| PC 3 | MSB -------------- | | | | | | | |
| PC 4 | 1 | 1 | 1 | 1 | 1 | 1 | 1 | 1 |

WITH VBID DATA(20bits) RECORDED

FIG.34A

| PC 0 | 0 | 1 | 1 | 0 | 0 | 1 | 1 | 0 |
|------|---|---|---|---|---|---|---|---|
| PC 1 | ←-------------- LSB | | | | 0 | 0 | 0 | 1 |
| PC 2 | -------------- WSS DATA -------------- | | | | | | | |
| PC 3 | 1 | 1 | 1 | 1 | 1 | 1 | MSB | |
| PC 4 | 1 | 1 | 1 | 1 | 1 | 1 | 1 | 1 |

WITH WSS DATA(14bits) RECORDED

FIG.34B

FIG. 40A
HAND DEVIATION CORRECTION 8
NO HAND DEVIATION CORRECTION

FIG. 40B
AE  AUTO  8  AUTO
              AUTO
    MANUAL    MANUAL
              MANUAL
    SHUTTER PRIORITY  AES
    IRIS PRIORITY     AEA

FIG. 40C
SHUTTER  9  60
            250
            4000
            10000

FIG. 40D
WB  AUTO  9  AWB
    OUTDOORS  ☀
    INDOORS   ☼
    HOLD      HOLD
              HOLD
    ONE PUSH  ◺

FIG. 40E
IRIS/GAIN  10  F1.6      0 dB
               F1.6     18 dB
               CLOSE    -3 dB
               CLOSE     0 dB

APPARATUS AND METHOD FOR RECORDING AND REPRODUCING A VIDEO SIGNAL WITH CAMERA SETTING DATA

BACKGROUND OF THE INVENTION

The present invention relates to apparatus and method for recording and reproducing a video signal with camera setting data and, more particularly, to a camera having a video tape recorder integrated therein which is operable to record and reproduce a video signal along with camera setting data which identifies the various settings of the camera during imaging of a video image.

As is known, a combination camera/video tape recorder, known as a camcorder, images a video image to produce a video signal and records the video signal on a magnetic tape. Like ordinary still cameras, various settings of the camcorder are manually or automatically adjusted prior to and during the imaging of the video image so that the highest quality of picture can be obtained. The camera settings that are adjusted generally include the iris setting, the shutter speed, and the gain and white balance.

Cameras with video tape recorders integrated therein are known to insert certain information signals, for example, closed caption, VBID and EDTV2 type signals, in the vertical blanking intervals of a video signal prior to recording the video signal on a magnetic tape.

One difficulty encountered in typical recording/reproducing devices is their general inability to record, reproduce and subsequently process video signals by utilizing the various settings of the camera that generated those video signals.

OBJECTS OF THE INVENTION

Therefore, it is an object of the present invention to provide apparatus and method for recording and reproducing a video signal with camera setting data which overcome the shortcomings of the above described devices.

Another object of the present invention is to provide apparatus and method for recording and reproducing a video signal with camera setting data which enables the recorded video signals to be processed in accordance with the stored camera setting data so as to produce high quality video images.

A further object of the present invention is to provide a recording and reproducing technique which allows for the automatic or manual processing and/or correction of recorded video signals by utilizing the stored camera setting data.

SUMMARY OF THE INVENTION

In accordance with one embodiment of the present invention, apparatus and method operate to establish various camera settings of an imaging device, e.g., a camera, in preparation of imaging a video image, image the video image so as to produce a video signal, generate camera setting data which identifies the various camera settings that were established for imaging the video image, and record the video signal in a first location of a track on a record medium, e.g., a magnetic tape, and the camera setting data in a second location of the track on the record medium.

As one aspect of the present invention, date and time data which represents a date and time at which the video image is imaged is generated, and the date and time data is recorded along with the video signal and camera setting data on the record medium.

As another aspect of the present invention, the video signal is recorded in a video data area of each track and the camera setting data is recorded as data packs having a common pack structure in a video auxiliary area of each track.

As yet a further aspect of the present invention, the camera setting data identifies the iris setting, shutter speed, white balance mode and focusing mode of the camera during imaging of the video image.

As yet another aspect of the present invention, the camera setting data identifies a vertical panning speed, a horizontal panning speed, manual control (hand deviation data), and distance data of the camera during panning imaging of the video image.

In accordance with another embodiment of the present invention, apparatus and method operate to reproduce from a record medium a video signal that represents a video image imaged by a camera and camera setting data that identifies various states of the camera during imaging of the video image, generate display data from the reproduced camera setting data, and output the reproduced video signal and the generated display data.

As one aspect of this embodiment, the display data is displayed to a user, and the video signal is modified in accordance with user instructions and the displayed display data.

BRIEF DESCRIPTION OF THE DRAWINGS

The following detailed description, given by way of example and not intended to limit the present invention solely thereto, will best be appreciated in conjunction with the accompanying drawings, wherein like reference numerals denote like references and parts, in which:

FIGS. 5A and 5B schematically illustrate the data structure of a pre-sync block and a post-sync block, respectively;

FIGS. 11A and 11B show the data structure of the ID data in the audio and video auxiliary areas;

FIG. 14 is a chart of the "large item" data as identified in a data pack;

FIGS. 15A to 15E illustrate the data structure of various audio auxiliary data packs;

FIG. 16A illustrates an audio auxiliary closed caption data pack, and FIGS. 16B to 16E illustrate the data structure of various video auxiliary data packs;

FIGS. 17A and 17B illustrate the data structure of two more video auxiliary data packs;

FIG. 18 identifies the audio auxiliary packs stored in successive tracks on a record medium;

FIG. 20 identifies the particular video auxiliary data packs stored in successive tracks;

FIG. 21 schematically illustrates the data structure of a subcode area recorded in accordance with a 525/50 video system;

FIG. 22 schematically illustrates the data structure of a subcode area recorded in accordance with a 625/50 video system;

FIG. 23 illustrates the data structure of a "consumer camera 1" data pack;

FIG. 24 illustrates the data structure of a "consumer camera 2" data pack;

FIG. 26 is a chart which identifies the type of signals that are inserted into the various composite video signals;

FIG. 30 is a chart which identifies the relationship between the data of the closed caption data pack and the audio mode data of the audio auxiliary source data pack;

FIGS. 32A and 32B are useful for explaining the apparatus of the present invention operating in the recording and reproducing modes;

FIGS. 34A and 34B illustrate the data structure of VBID data and WSS data stored in the video auxiliary TR pack;

FIGS. 40A to 40E schematically illustrate the various displays of the camera control data in accordance with the present invention.

DETAILED DESCRIPTION OF THE PREFERRED EMBODIMENTS

Figure 1:
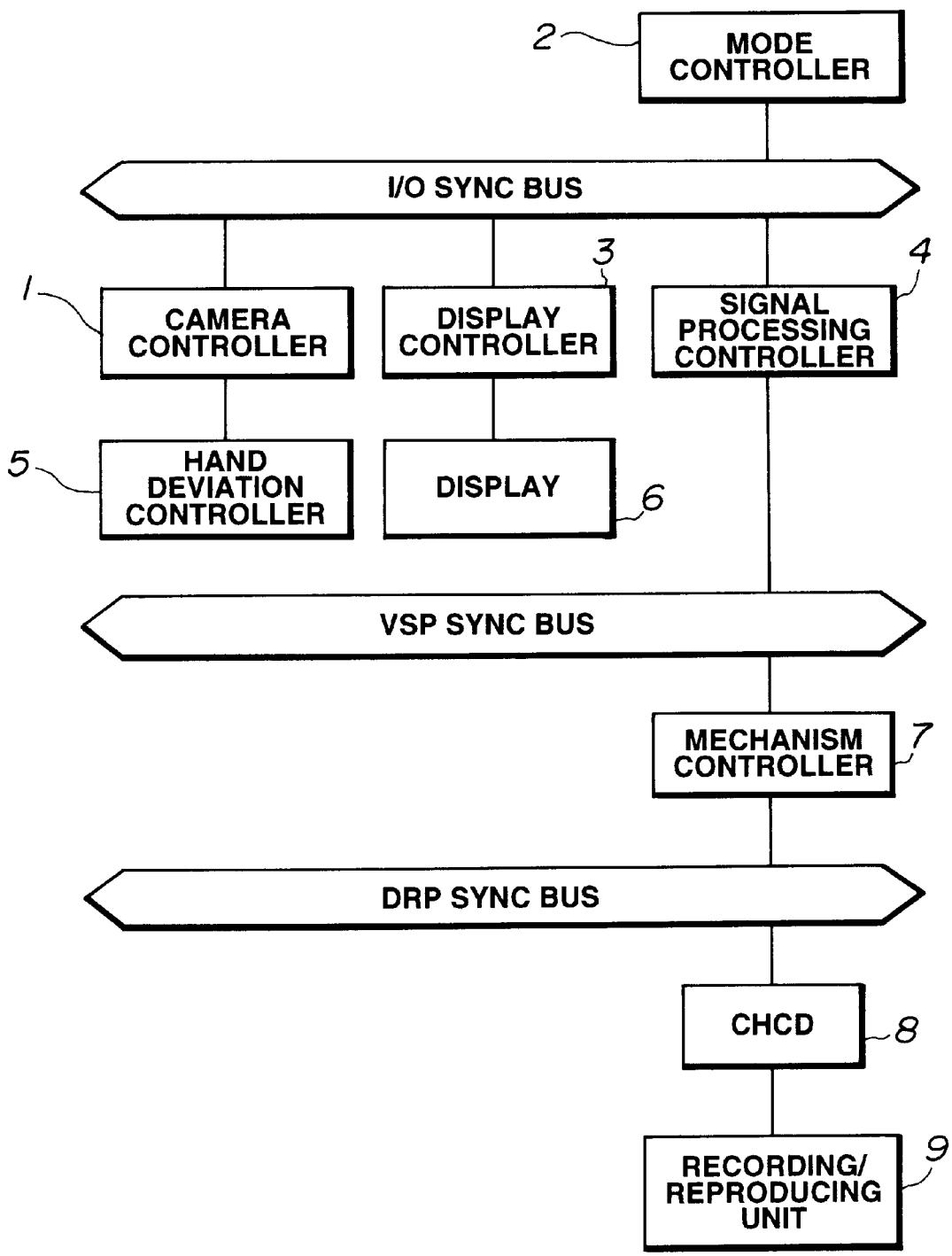
FIG. 1 is a block diagram of apparatus for recording a video signal with camera setting data in accordance with the present invention.

Referring now to the drawings, and particularly to FIG. 1 thereof, apparatus for recording and reproducing a video signal with camera setting data (hereinafter, either "video tape recorder" or "camera") is shown as comprising a camera controller 1, a mode controller 2, a display controller 3, a signal processing controller 4, a hand deviation controller 5, a display 6, a mechanism controller 7, a channel coder 8, a recording/reproducing unit 9, as well as an I/O sync bus, a VSP sync bus and a DRP sync bus. Although not shown, the apparatus of the present invention further includes an imaging unit (i.e., a camera) which images a video image to produce a video signal. The video tape recorder of FIG. 1, also identified herein as the camera data control system, records camera setting data that is generated in controller 1 on a record medium in the manner to be discussed.

Figure 2:
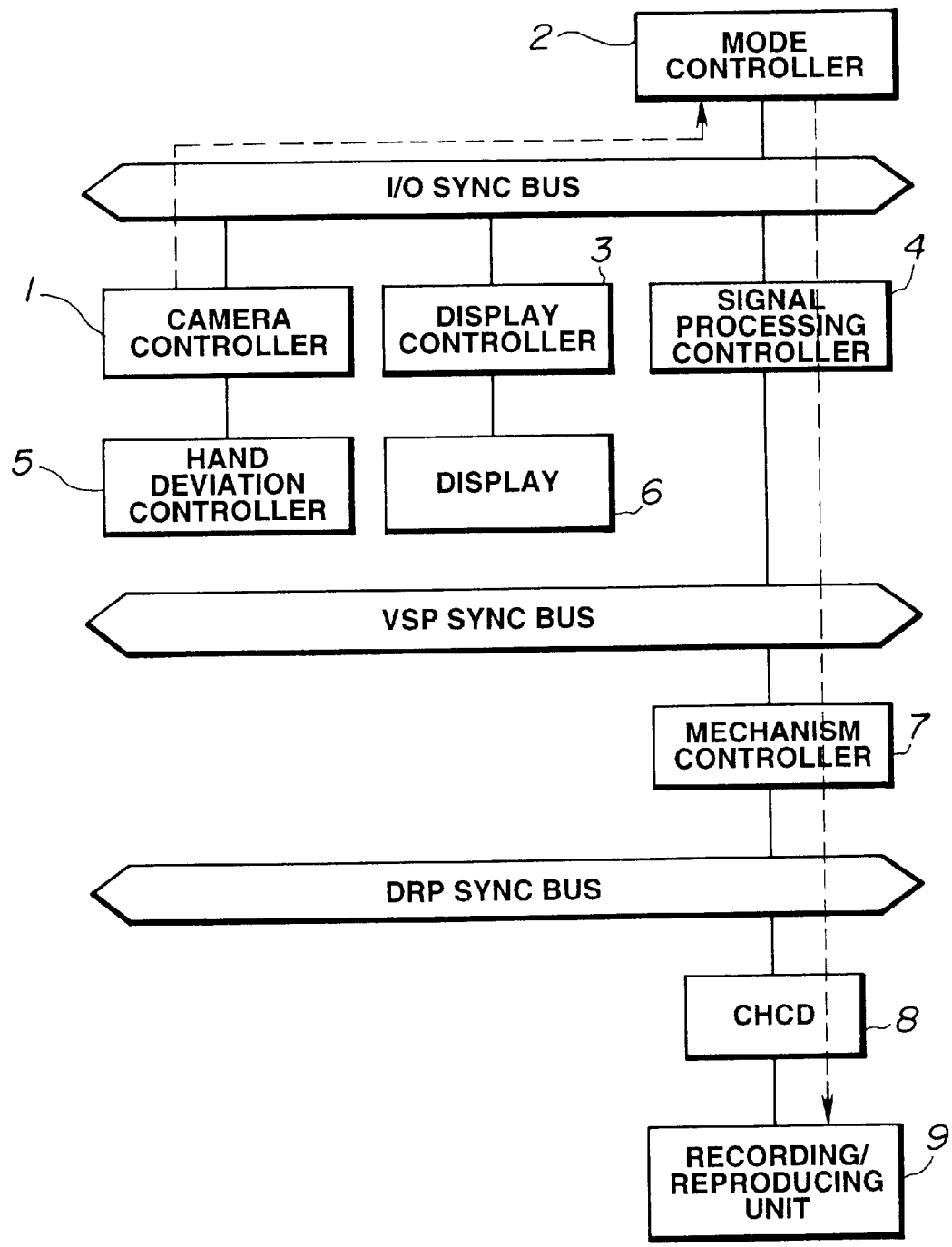
FIG. 2 is another block diagram of apparatus for recording a video signal with camera setting data which illustrates a signal flow of the camera setting data during a recording operation of the apparatus of the present invention.
Figure 3:
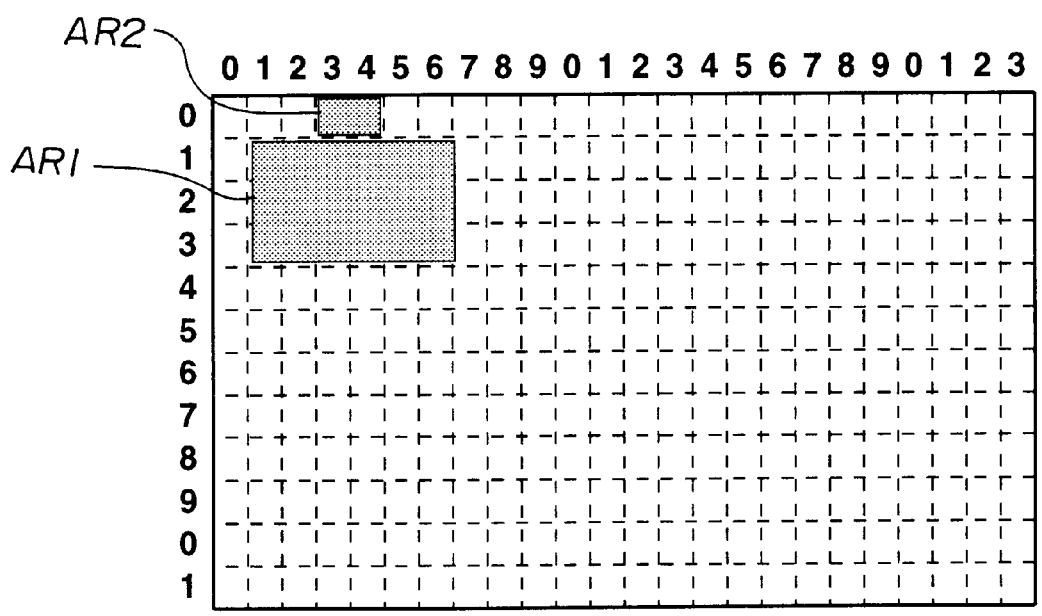
FIG. 3 is a schematic illustration of a camera display in accordance with the present invention.

Camera controller 1, in response to control signals from hand deviation controller 5, sets the various camera settings, including the AE mode, the shutter speed, the white balance, the iris/gain setting, etc., and transmits via the I/O sync bus, the camera settings to mode controller 2, such as shown in FIG. 2. Hand deviation controller 5 receives user input instructions to manually set the desired camera settings. Mode controller 2 converts the camera setting information into camera setting data (to be discussed) and supplies the camera setting data via the I/O sync bus to signal processing controller 4 which supplies the data via the VSP sync bus to mechanism controller 7 and then to channel coder 8 before being recorded on the record medium (e.g., a magnetic tape). During a recording operation of the video tape recorder of the present invention, display controller 3 controls display 6 to display those camera settings that are manually adjusted but to not display those settings which have been automatically adjusted. FIG. 3 is a schematic illustration of display 6 and which shows the manually adjusted settings in either display area AR1 or display area AR2. For example, if the camera is operating in a mode in which the iris is manually set, the particular mode of operation in which the iris is manually adjusted is indicated in the viewfinder (i.e., display 6) as well as the actual manually set value of the iris. As another example, if the amount of white balance is manually adjusted, the manually adjusted value also is displayed in, for example, display area AR2 of display 6. Further, if the shutter speed is manually adjusted, the shutter speed value is displayed in area AR1 as well as on a separate LCD panel of the camera.

Figure 4:
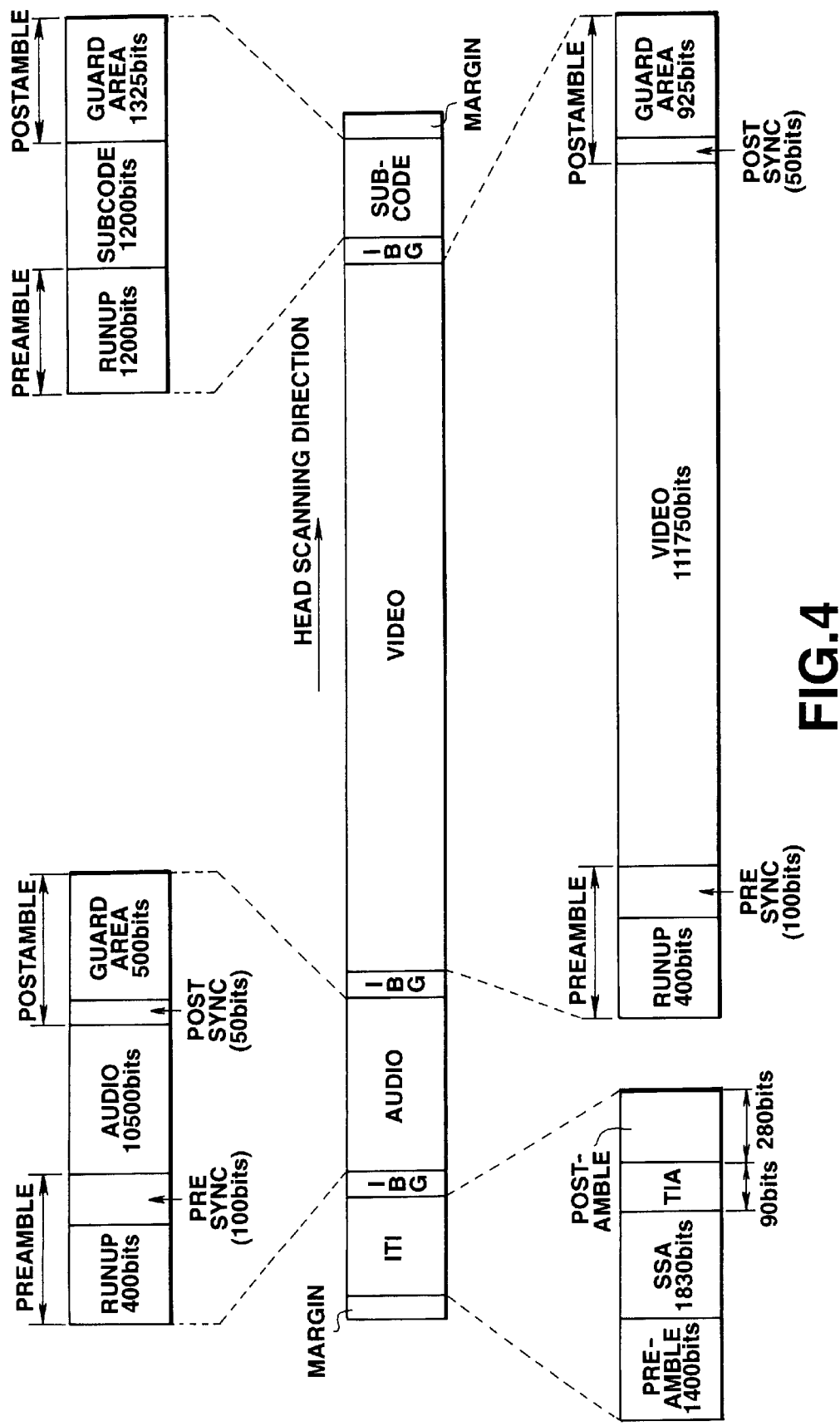
FIG. 4 illustrates the data structure of a track recorded on a record medium in accordance with the present invention.

Referring next to FIG. 4, the data structure of a track recorded on a magnetic tape in accordance with the present invention is shown. The track format is comprised of a margin, followed by an ITI area, an audio area, a video area, a subcode area, and another margin area. Inter-block gaps (IBG) are provided between the ITI, audio, video and subcode areas. The ITI area is comprised of a 1400 bit preamble, followed by an 1830 bit start-sync block (SSA) area, a 90 bit track information (TIA) area and a 280 bit postamble area. The preamble of the ITI area allows for PLL run-in during a playback operation, the postamble establishes the end of the ITI area, and the SSA and TIA areas each is comprised of 30 bit blocks of data in which a 10 bit preset sync pattern (ITI-sync) is recorded at the beginning of each block thereof. The 20 bits following the 10 bit preset sync pattern of each block in the SSA area identify the number of the respective sync block, and the 20 bits following the preset sync pattern in the TIA area includes various recording format information, including a 3 bit APT data, an SP/LP flag which indicates the type of recording mode, and a PF flag which indicates the reference frame of the server system during the recording operation. The APT data defines the data structure of the track and is generally "000" in consumer type digital video tape recorders. A relatively large number of sync blocks, each having a relatively small amount of code therein, are recorded at predetermined fixed intervals on each track of the magnetic tape and, thus, post-recording of data in the sync blocks is easily carried out.

The audio area of a track, as shown in FIG. 4, is comprised of a 400 bit run-up area for PLL engagement purposes, a 100 pre-sync area which allows for the detection of an audio sync block, and a post-amble area that includes therein a 50 bit post sync which identifies the end of the audio area followed by a 500 bit guard area for protecting the audio data during a post-recording operation. The pre-sync block and post-sync block, as shown in FIGS. 5A and 5B, respectively, each is comprised of 2 bytes of sync data, followed by 3 bytes of identification data (ID0, ID1 and IDP). The 6th byte of the pre-sync block includes an SP/LP flag, which is redundant to the flag stored in the ITI area, and is utilized in the event the ITI area cannot be reproduced. The 6th byte of the post-sync block is not used.

Figure 6A:
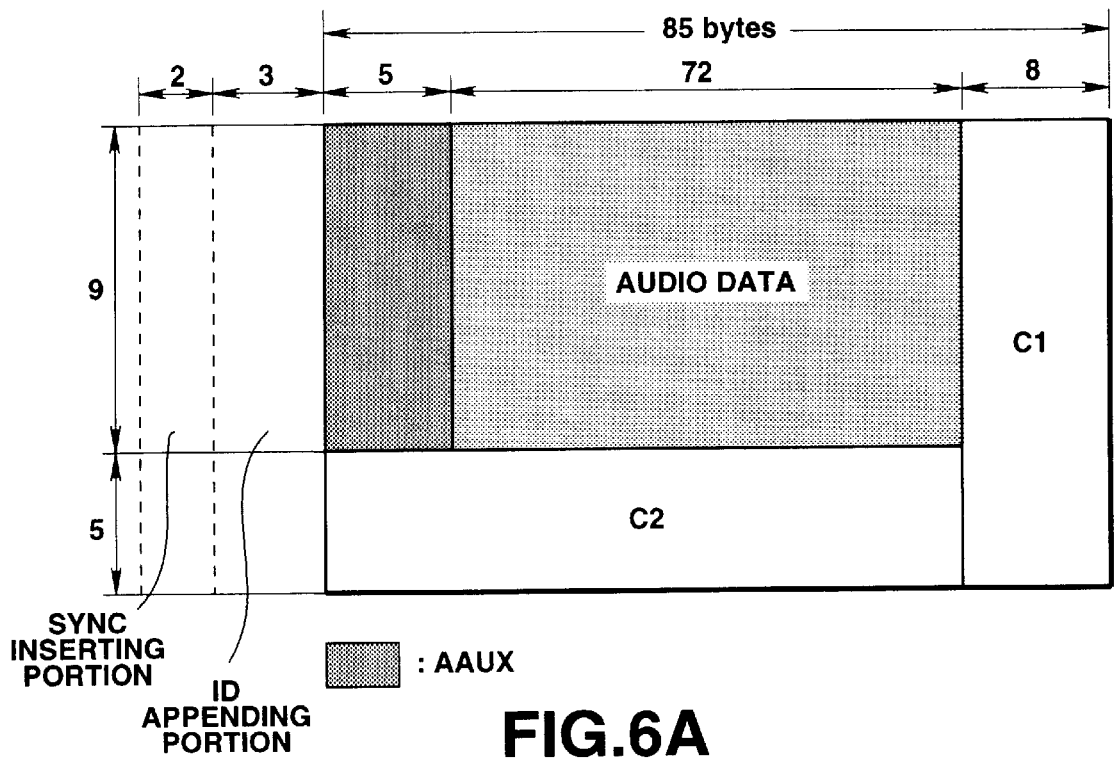
FIGS. 6A and 6B schematically illustrate the data structure of the audio area of a track.
Figure 6B:
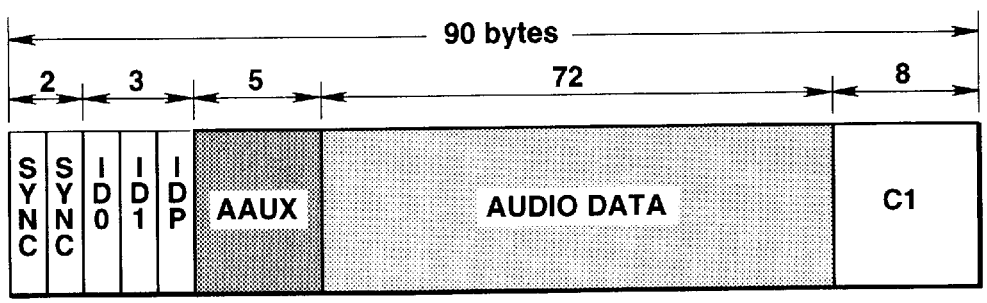

The audio data stored in the audio area of each track is located between the pre-sync and post-sync blocks shown in FIG. 4 and has a data structure as shown in FIG. 6A. The "data" portion of the audio area is comprised of an audio auxiliary (AAUX) area in which 5 byte packs of AAUX data are stored, and an audio data area in which sound information are stored. The audio area is comprised of 14 blocks in which the first 9 blocks include AAUX data, audio data, and horizontal parity C1, and the succeeding 5 blocks each is comprised of vertical parity data C2 and horizontal parity data C1. The 14 blocks each also include at the beginning thereof 2 bytes of sync data followed by 3 bytes of identification data. FIG. 6B illustrates the data structure of each of the first 9 blocks shown in FIG. 6A.

Figure 7A:
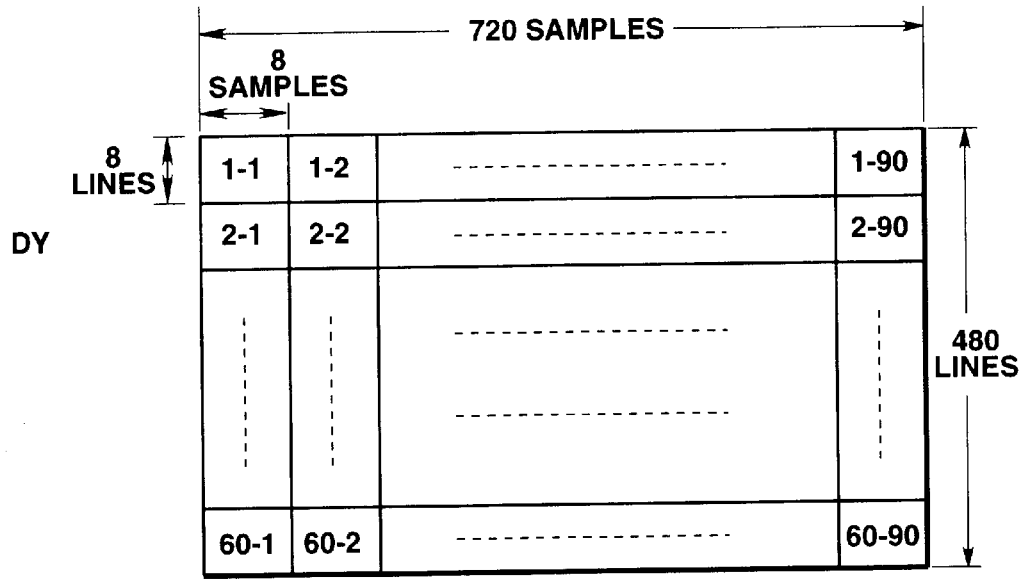
FIGS. 7A and 7B schematically illustrate the data structure of the video signal.
Figure 7B:
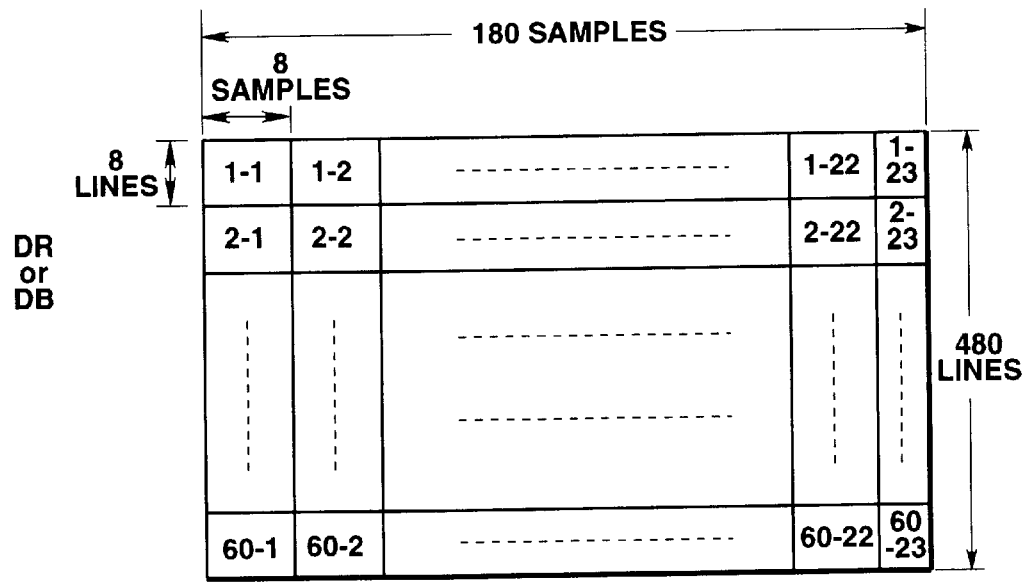

Referring again to FIG. 4, the video area of a track has a data structure that is similar to the audio area and, as shown, is comprised of a run-up area, a pre-sync area, a video data area, a post-sync area, and a guard area. A composite video signal is separated into its respective Y, R-Y and B-Y components, and converted to digital data. In a 525/60 video system, 720 samples in the horizontal direction and 480 lines in the vertical direction of the Y signal are extracted for each frame, and 180 samples in the horizontal direction and 480 lines in the vertical direction of the R-Y and B-Y signals are extracted for each frame. The extracted data is divided into blocks of data, such as shown in FIGS. 7A and 7B. FIG. 7A illustrates the Y(DY) signals in the block structure and FIG. 7B illustrates the R-Y(DR) and B-Y(DB) signals in the block structure, in which pairs of vertically adjacent blocks are grouped together to form each block since the "right hand" side blocks have only 4 horizontal samples each. The block structure shown in FIGS. 7A and 7B is comprised of 8100 blocks per frame and a block that is comprised of 8 horizontal samples and 8 vertical lines is identified herein as a DCT block.

Figure 8:
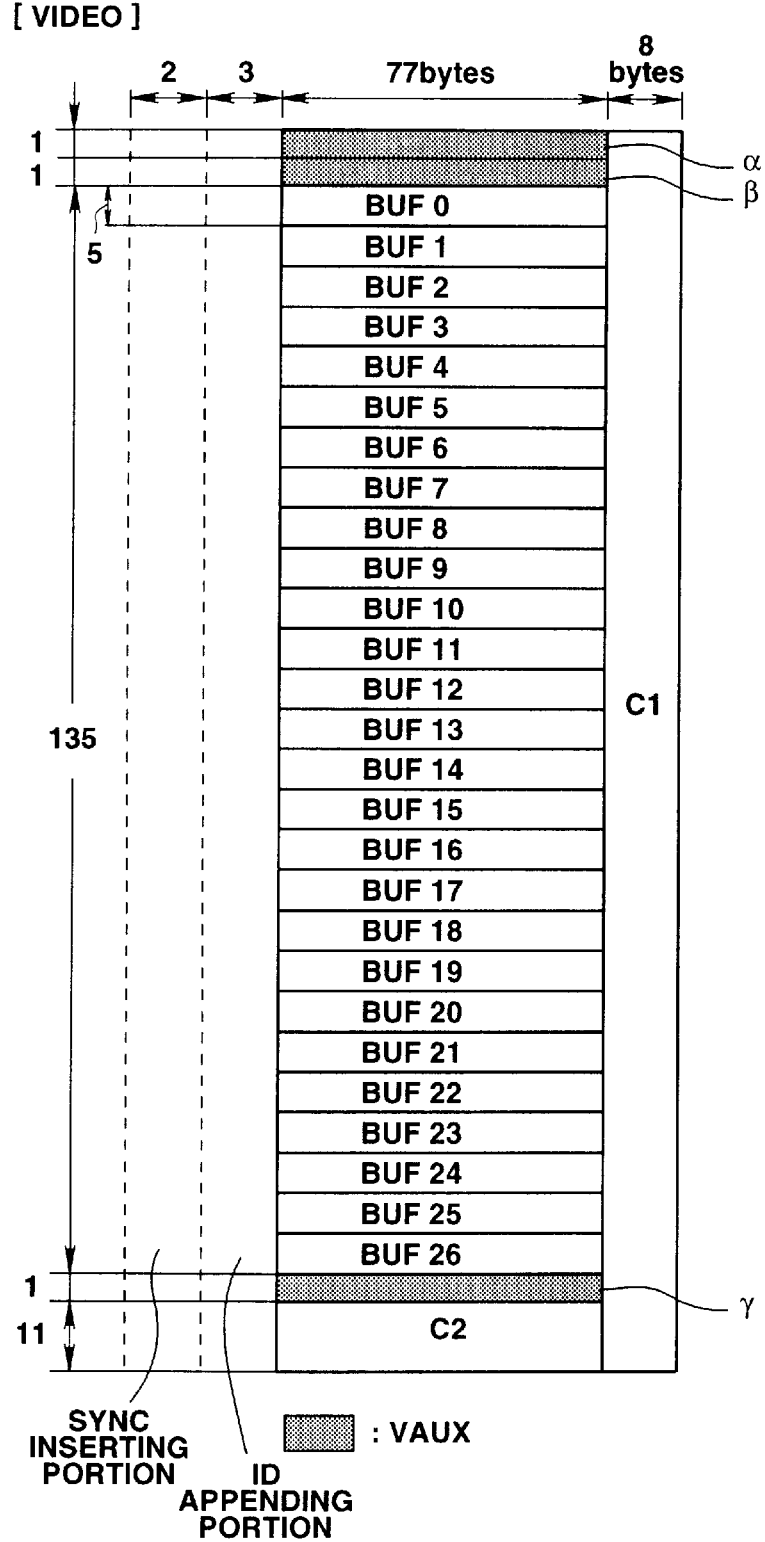
FIG. 8 shows the data structure of a video frame having error correction data added thereto.
Figure 9A:
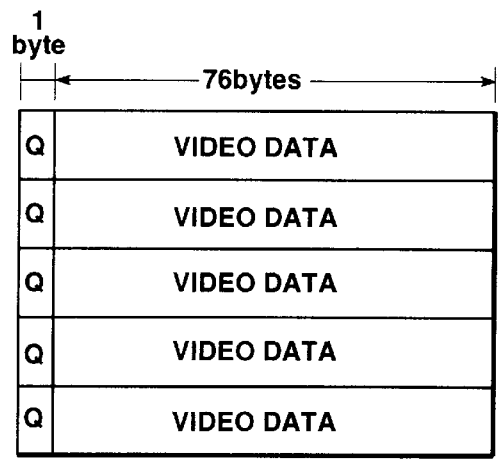
FIGS. 9A to 9C schematically illustrate the data structure of the video area of a track.
Figure 9B:
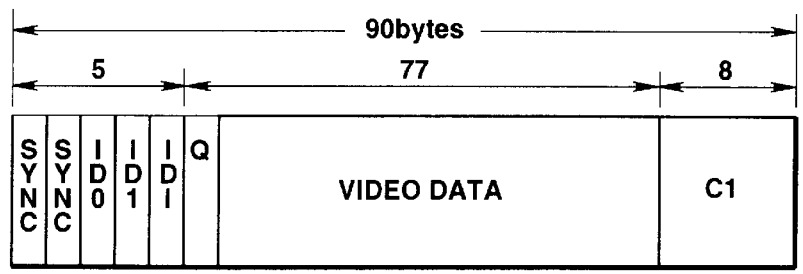
Figure 9C:
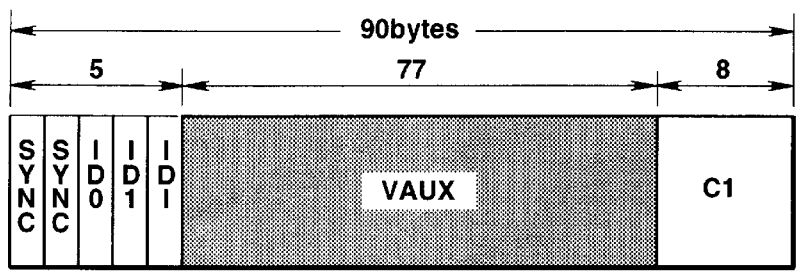

The blocks are shuffled and transformed in a manner well known in the art, and the transformed blocks are quantized and variable length encoded in which the quantization step is established in terms of 30 DCT blocks as a single unit so that the total amount of resultant encoded data does not exceed a predetermined value. The encoded data corresponding to 30 DCT blocks is identified herein as a buffering unit. FIG. 8 illustrates the data structure of the video area of a track in which buffering units 0 to 26 each is comprised of 5 video blocks, as shown in FIG. 9A. Each block in the buffering unit is comprised of 1 byte of Q data, which corresponds to a quantization parameter, followed by 76 bytes of video data. Referring back to FIG. 8, the video area is comprised of a first block α having VAUX data stored therein, a second block β having VAUX data stored therein, 27 buffering units, a third block γ having VAUX data stored therein, and 11 blocks of data having vertical parity data C2 stored therein. Each VAUX block, buffering unit, and block of C2 data, is preceded by 2 bytes of sync data and 3 bytes of identification data, and is followed by 8 bytes of horizontal parity data C1. Thus, each "video data" block in the video area of a track is comprised of 90 bytes of data, as shown in FIG. 9B, and each VAUX block (α, β and γ) in the video area of a track also is comprised of 90 bytes of data, as shown in FIG. 9C.

It is seen in the above discussed framing format, that since 27 buffering units are stored in each track on the magnetic tape, and since each track includes therein 810 DCT blocks of video data and each frame corresponds approximately to 8100 DCT blocks of video data, one video frame is recorded in 10 tracks on the magnetic tape.

Figure 10:
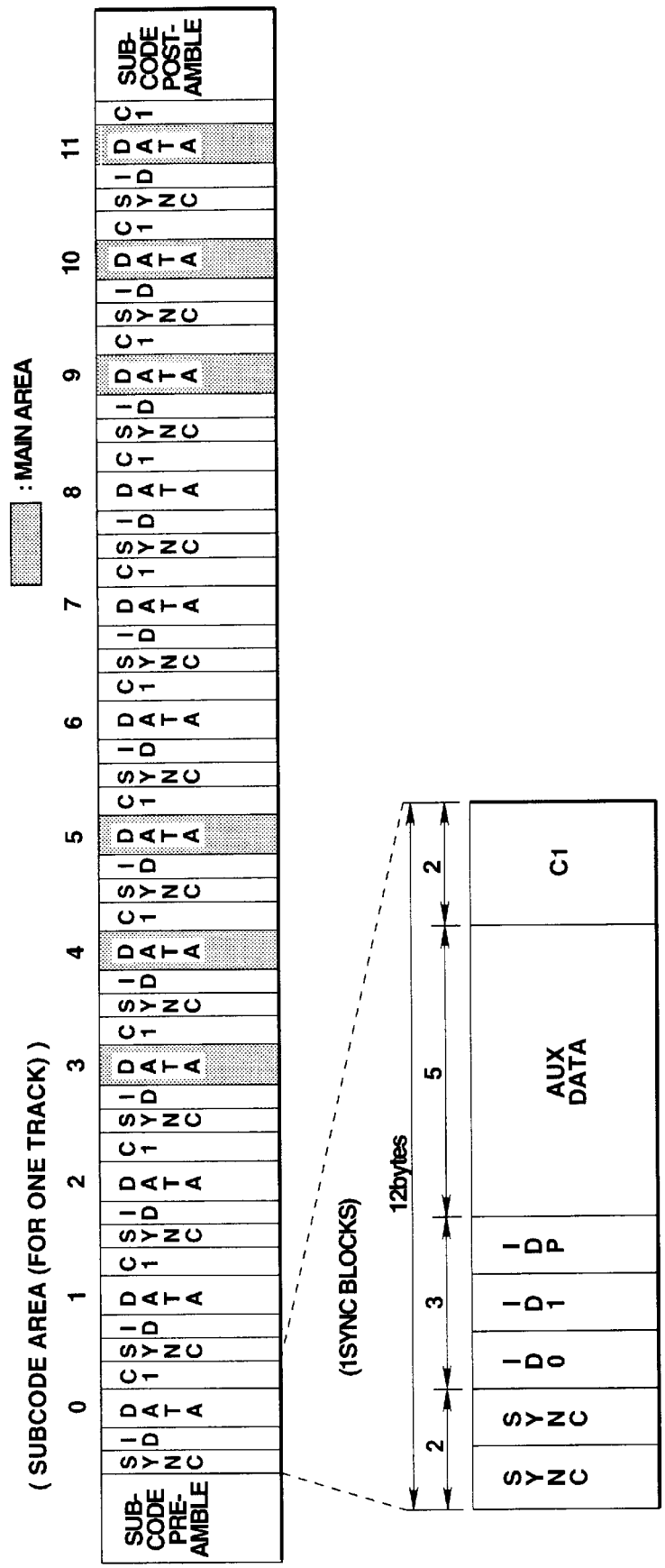
FIG. 10 illustrates the data structure of the subcode area of a track.

Referring next to FIG. 10 of the drawings, the data structure of the subcode area of a track is shown. The subcode area generally is provided for high speed searching of the video and/or audio data, and is comprised of a subcode preamble, followed by 12 sync blocks and a postamble. Unlike the video and audio areas of a track, the subcode area does not include a presync and postsync area. Each subcode sync block, as shown in expanded form in FIG. 10, is comprised of two sync bytes, three identification bytes, a 5 byte auxiliary data area, and two bytes of horizontal parity C1.

Referring back to FIGS. 9B and 9C, the sync blocks of the audio, video and subcode areas are 24/25 modulated so that the amount of data of each of the video, audio and subcode areas have the amount of data shown in FIGS. 9B and 9C. As is known, 24/25 modulation converts 24-bit based data to 25 bits so that the pilot frequency components for tracking control are in accordance with the recorded codes.

The ID data following the 2 sync bytes shown in FIGS. 5A, 5B, 6B, 9B, 9C and 10 have a data structure as shown in FIGS. 11A and 11B. As shown in both FIGS. 11A and 11B, byte ID1 in all of the above discussed areas, identifies the sync block number of the block in which the identification data is located. The 4 least significant bits of identification byte ID0 identify the track (i.e., track number) within each frame. Referring to FIG. 11A, which illustrates the data structure of the identification data in AAUX, audio and video sync blocks, the four most significant bits of identification byte ID0 identify a sequence number which is utilized for variable speed reproduction. The three most significant bits of identification byte ID0, shown in FIG. 11B, identify the data structure of the area in which the presync, postsync and C2 parity sync blocks are located. That is, identification data located in the audio area of a track identifies the data structure of the audio area (data AP1), and identification data in the video area of a track identifies the data structure of the video area (data AP2). Data AP1 and AP2 generally have the value "1000" for consumer type digital video tape recorders.

Figures 12, 13:
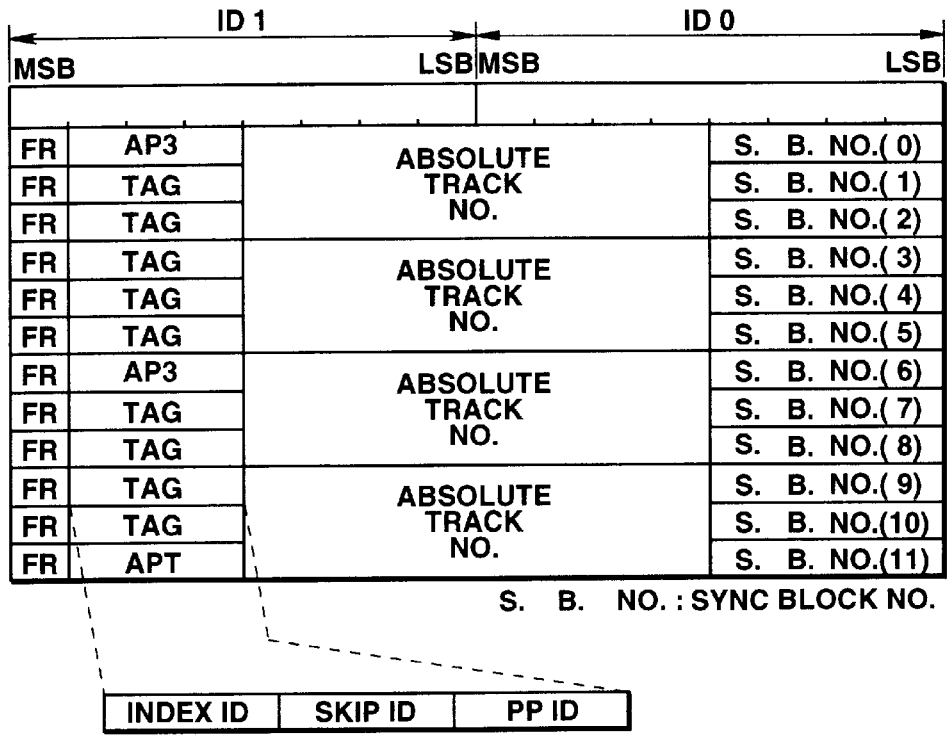
FIG. 12 illustrates the data structure of the ID data in the subcode area.
FIG. 13 shows the data structure of a pack of data.

FIG. 12 illustrates the data structure of the identification data ID0 and ID1 in all of the sync blocks in the subcode area of a track. The most significant bit (FR) of byte ID1 of each of the sync blocks identifies the particular field, i.e., odd or even field, to which the current track corresponds. In other words, flag FR indicates whether the track is one of the first 5 tracks of a frame or is one of the second 5 tracks of the frame. The next three most significant bits (AP3) of bit ID1 in sync block 0 and sync block 6 identify the data structure of the subcode area, and the second through fourth most significant bits in ID1 of sync block 11 (APT) identify the data structure of the track. The three bits of byte ID1 identified at "tag" in sync blocks 1–5 and 7–10 are shown in expanded form in FIG. 12 and include an index ID which is used for indexing purposes, a skip ID which is used to skip various frames, for example, commercials, and a PP ID which is used to identify a frame as a still image. The 4 least significant bits of byte ID1 and the 4 most significant bits of byte ID0 are used to store the absolute track number and this number is stored four times in the subcode area of each track, as shown. The 4 least significant bits of byte ID0 of each sync block identifies the number of that sync block.

As previously discussed, the audio auxiliary (AAUX) data is stored in the audio area of a track, the video auxiliary (VAUX) data is stored in the video area of a track, and subcode auxiliary (AUX) data is stored in the subcode area of each track. These auxiliary data are stored in units of 5 bytes, called a 5 byte "pack" or simply a data pack, and have a data structure as shown in FIG. 13. The first byte PC0 of each data pack identifies the type of data stored in the pack and is called the "item" or "header" of the pack. Bytes PC1 to PC4 of each pack are the pack data as defined by the item (byte PC0). The item (PC0) is divided into the upper four bits, referred to as the "large item", and the lower four bits, referred to as the "small item". The large item identifies the "Group" to which the pack data pertains and the small item identifies specifically what information is contained within the pack data (PC1–PC4) within the specified Group.

FIG. 14 is a table showing the available Groups and, as shown, the large item can specify the Groups of control (0000) title (0001), chapter (0010), part (0011), program (0100), audio auxiliary data (AAUX) (0101), video auxiliary data (VAUX) (0110), camera (0111), line (1000) and soft mode (1111). Large items (1001) to (1110) are reserved for future use and large item (1111) identifies a pack having no information.

FIGS. 15A–15E and 16A illustrate the data structure of various audio auxiliary (AAUX) packs that are stored in the AAUX audio area. The pack "AAUX source" is shown in FIG. 15A and has an item value of 01010000 (PC0) and bytes PC1 to PC4 contain the information of locked mode flag (LF), audio frame size (AF size), audio channel mode (CH), field system (50/60), signal type (STYPE), emphasis flag (EF), time constant of emphasis (TC), sampling frequency (SMP) and quantization data (QU). Flag LF identifies whether or not the audio sampling frequency is locked to the picture signals, data AF size identifies the number of audio samples per frame, data CH identifies the number of audio channels, and PA and audio mode identify the type of audio mode, such as stereo or mono-audio.

FIG. 15B illustrates the data structure of the pack "AAUX source control", which has the item value (PC0) of "01010001". Bytes PC1 to PC4 of this pack identify the type of copy protection of the audio signal, whether the video tape is an original version, whether the original signal was an analog source signal, copy generation data, cipher type data (CP), a recording start frame flag (REC ST), a recording end frame flag (REC END), recording mode data (REC MODE) which indicates the type of recording (e.g. original recording, post recording, insert recording, etc.), a direction flag (DRF), a play back speed (SPEED), and a genre category.

FIG. 15C illustrates the data structure of the pack "AAUX REC DATE", and which has the item value of "01010010".

Bytes PC1 to PC4 of this pack include a daylight savings time flag (DS), a thirty minute flag (TM) which indicates a time difference of at least thirty minutes, data which indicates the time difference, and data which indicates the day, week, month and year on which the particular video signal was recorded.

FIG. 15D illustrates the data structure of the pack "AAUX REC TIME", and which has the item value of "01010011". Bytes PC1 to PC4 of this pack identify the particular time at which the data was recorded. In the preferred embodiment, the time recorded is based on the SMPTE format.

FIG. 15E illustrates the data structure of the pack "AAUX REC TIME BINARY GROUP" and which has the item value of "01010100". Bytes PC1 and PC4 of this pack contain 8 binary groups of SMPTE time code.

FIG. 16A illustrates the data structure of the pack "AAUX CLOSED CAPTION" and which has the item value of "01010101". Bytes PC1 and PC2 identify the language of the primary "or main" language and its type, as well as a secondary (or second) audio language of the data included in the closed caption signals that are transmitted during the vertical blanking interval of a television signal. The three bits of the main and second audio languages are defined as follows:

000=unknown;
001=English;
010=Spanish;
011=French;
100=German;
101=Italian;
110=Other;
111=none.

The type of the main audio language (main audio type) is defined as follows:

000=unknown;
001=mono;
010=simulated stereo;
011=true stereo;
100=stereo;
101=data service;
110=other;
111=none.

The second audio types are defined as follows:

000=unknown;
001=mono;
010=descriptive video service;
011=non-program audio;
100=special effects;
101=data service;
110=other;
111=none.

When a closed caption pack is stored in the AAUX main area (to be discussed), additional data relating to main audio and second audio follow the above-discussed data. However, a "no information" pack is recorded in place of a closed caption pack, and data corresponding to the main speech and second speech follow the information "audio mode" in the AAUX source pack.

FIGS. 16B–16E, 17A and 17B illustrate the data structure of various VAUX packs that are stored in the video auxiliary area of the video area of a track. Referring first to FIG. 16B, the data structure of the pack "VAUX SOURCE" is shown.

The item value of this pack is "0110000" (PC0) and bytes PC1 to PC4 include data pertaining to the number of television channels (tens of TV channel and units of TV channel), a black and white (B/W) flag which identifies if the video signal is a monochromatic signal, a color frames enable (EN) flag with a color frames identification code (CLF), source code data which specifies the source of a video signal (e.g. camera, line, cable, tuner, soft tape, etc.), the type of video system (50/60 and STYPE), and tuner category data which identifies the type of tuning system (e.g. broadcast/satellite broadcast, etc.).

FIG. 16C illustrates the data structure of the pack "VAUX SOURCE CONTROL" and which has an item value of "01100001". Bytes PC1 to PC4 of this pack include SCMS data, as well as other data which specify the type of copy protection (if any) of the video signal, whether the tape is original or a copy, the source of the video signal (e.g., analog or digital), copy generation data, cipher type data (CP), a recording start frame flag (REC ST), a recording end frame flag (REC END), the type of recording mode of the stored data (e.g. original recording, post recording, insert recording, etc.), the aspect ratio (BC SYS and DISP), a field flag (FF) indicating whether a field is to be outputted twice, a flag (FS) which specifies whether a first field or a second field is to be supplied during the period of the first field, a flag (FC) which specifies whether or not the data of the current frame is different from the data of a previous frame, a flag (IL) which specifies the type of scanning (e.g. interlaced or non-interlaced), a flag (ST) which specifies if the stored image is a still picture, and data which specifies whether the picture is recorded by a still camera, and the category of the genre.

FIG. 16D illustrates the data structure of the pack "VAUX REC DATE" and which has the item value of "01100010". Bytes PC1 to PC4 of this pack identify the date on which the video signal is recorded. FIG. 16E illustrates the data structure of the pack "VAUX REC TIME", has the item value of "01100011" and bytes PC1 to PC4 thereof identify the SMPTE time of the frame in which the pack data is included. FIG. 17A illustrates the data structure of the pack "VAUX REC TIME BINARY GROUP", which has the item value of "01100100", and bytes PC1 to PC4 thereof include 8 binary groups of time code.

FIG. 17B illustrates the data structure of the pack "VAUX CLOSED CAPTION". This pack has an item value of "01100101" and bytes PC1 to PC4 identify the closed caption signals that are transmitted during the vertical blanking period of the analog video signal.

As described above, the audio, video and subcode areas of the track store auxiliary data in the 5 byte pack structure. In the preferred embodiment of the present invention, the respective AAUX, VAUX and subcode AUX data each comprises a "main area" and an "optional area" and are described below.

Referring next to FIG. 18, the AAUX pack structure of the audio area of 10 successive tracks are shown in which each track includes nine audio auxiliary packs (numbered 0–8) and in which the audio area of each track has the data structure as shown in FIG. 6A, previously discussed. Referring FIG. 18, nine packs are recorded in each of ten tracks of a frame where pack number 0 corresponds to the pack in the first audio sync block and pack number 8 corresponds to the pack in the ninth audio sync block. Packs numbers 3–8 in odd numbered tracks contain the numbers 50, 51 . . . 55, respectively, and pack numbers 0–5 in even numbered tracks also contain the numbers 50, 51 . . . 55, respectively. In this area, i.e., those packs which contain a number, comprises the AAUX main area, while the other area, i.e., those packs that do not contain a number, comprises the AAUX optional area. The packs in the main AAUX area, as identified in FIG. 18, identify the value of the item (by PC0), in hexadecimal notation, of the AAUX packs. For example, the AAUX source pack is stored as pack number 3 in tracks 1, 3, 5, 7, 9 and as pack number 0 in tracks 2, 4, 6, 8 and 10.

Figure 19:
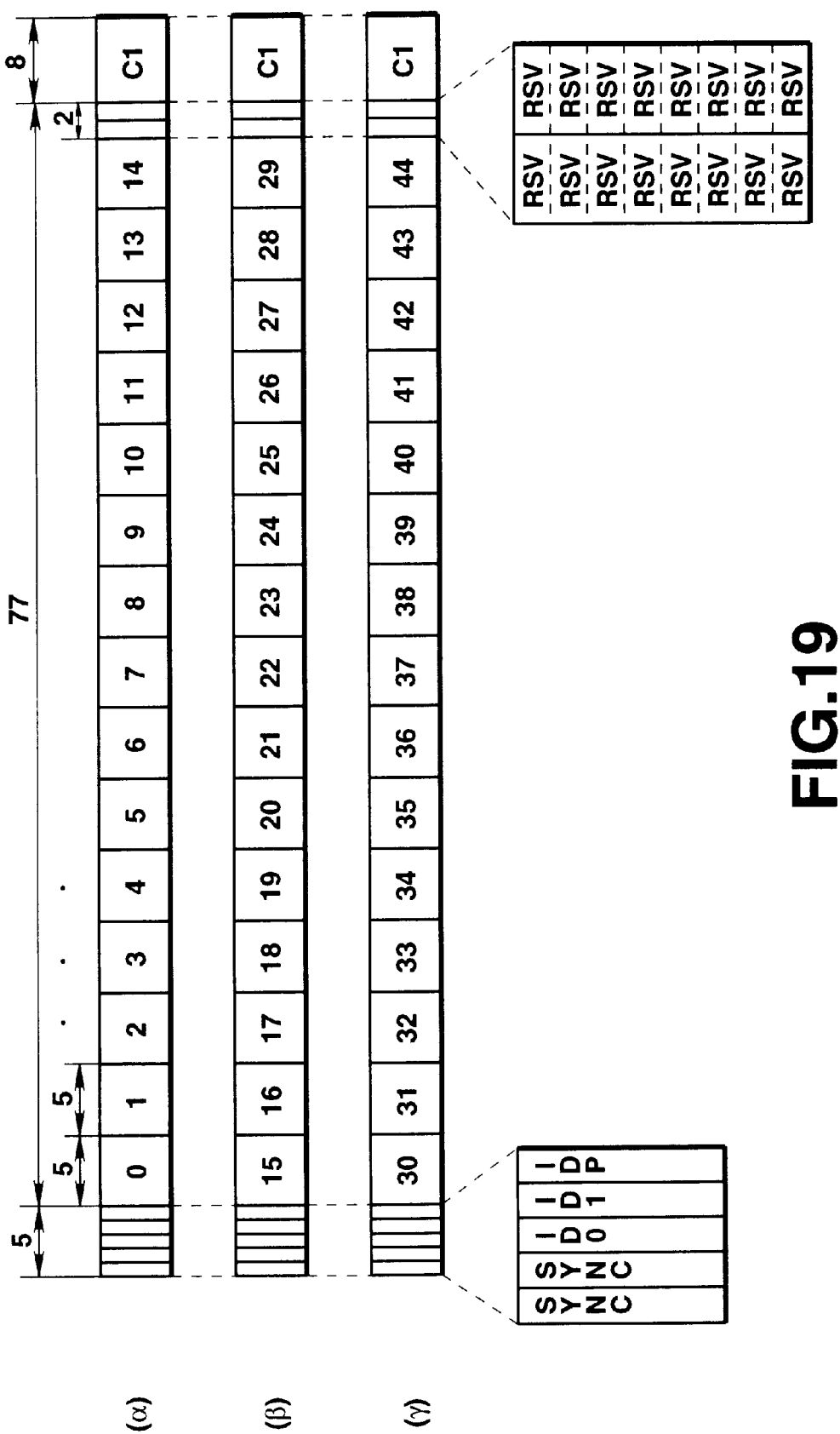
FIG. 19 illustrates the data structure of the video auxiliary area of a track.

As previously discussed with reference to FIG. 8, sync block α, β and γ each includes a 77 byte VAUX data area. FIG. 19 illustrates the data structure of sync blocks α, β and γ in which each of these blocks includes 15 five byte packs, followed by two unused bytes. As shown, a sync block α includes pack numbers 0–14, sync block β includes pack numbers 15–20, and sync block γ includes pack numbers 30–44, for a total of 45 packs that are stored in the video area of a track.

FIG. 20 illustrates the pack structure of the VAUX area of the video area of 10 tracks (1 frame) and, as shown, pack numbers 39–45 in odd numbered tracks and pack numbers 0–5 in even numbered tracks comprise the VAUX main area. The other packs, i.e., those that do not contain a number, comprise the VAUX optional area. The packs in the VAUX main area containing numbers 60–65 correspond to the packs "VAUX SOURCE", "VAUX SOURCE CONTROL", "VAUX REC DATE", "VAUX REC TIME", "VAUX REC TIMES BINARY GROUP", and "VAUX CLOSED CAPTION", respectively, shown in FIGS. 16B–16E, 17A and 17B.

Figures 21, 22:
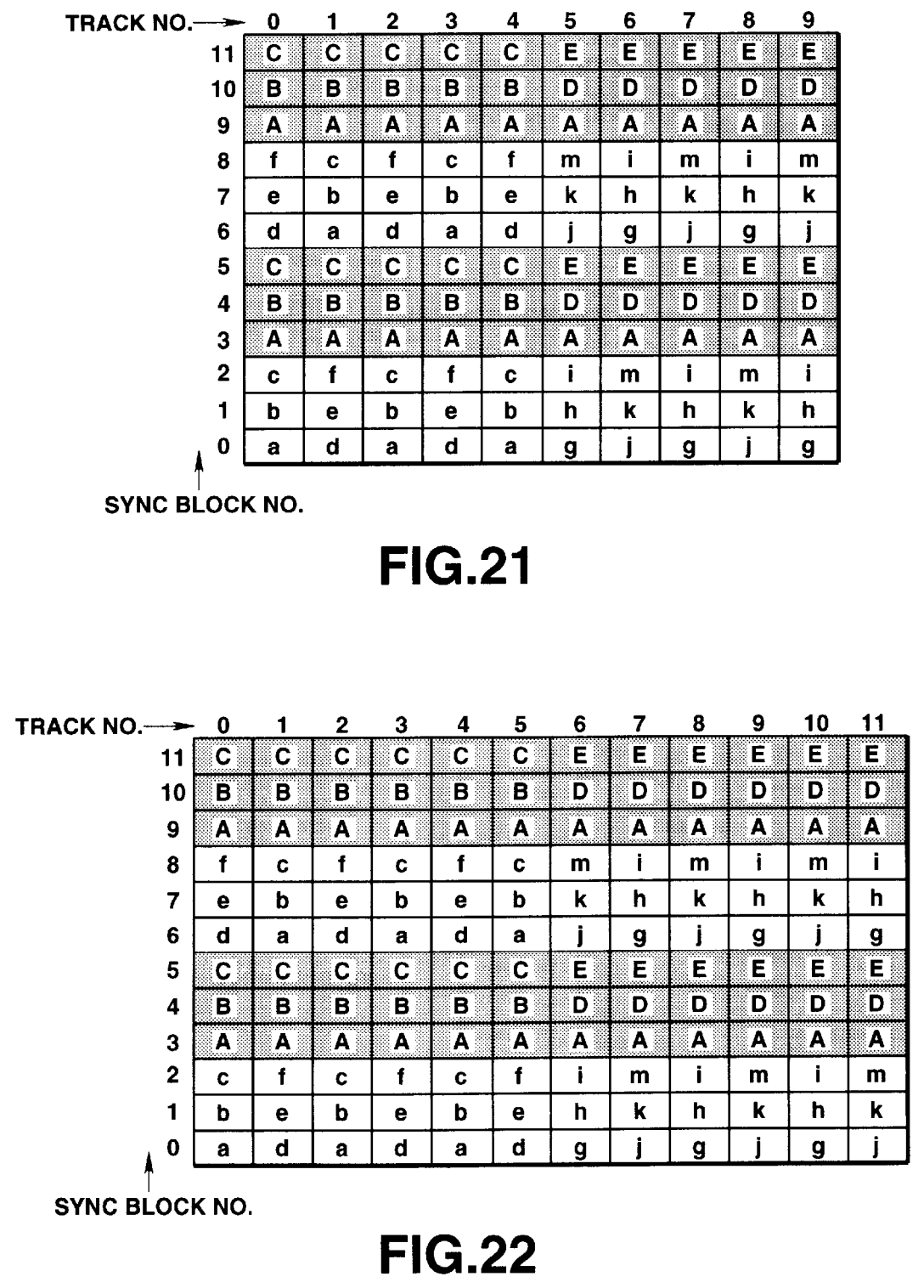

As previously discussed with reference to FIG. 10, the subcode area of each track includes 12 sync blocks in which each sync block includes therein five bytes of auxiliary (AUX) data. A five byte pack is stored as the five bytes of auxiliary data in each sync block and, thus, the subcode area of each track includes 12 sync packs. Referring next to FIG. 21, the block structure of the subcode area of 10 tracks in a 525/50 system in which each frame is comprised of 10 tracks is shown. In FIG. 21, sync blocks 3–5 and 9–11 are shaded and represent the main area of the subcode area, and the remaining sync blocks 0–2 and 6–8 represent the optional area. The upper case letters in the main area of this subcode area represent subcode auxiliary packs, such as those previously discussed, and the lower case letters in the optional area of the subcode area represent optional subcode auxiliary packs which may be stored in the optional subcode area. FIG. 22 is similar to FIG. 21 but illustrates the pack structure of the subcode area of 12 tracks of a 525/60 system in which each frame is comprised of 12 tracks on a magnetic tape.

Referring back to FIG. 14, a pack having a large item value of "0111" indicates that the pack pertains to the Group "CAMERA". Several packs in the Group CAMERA include "CONSUMER CAMERA 1", "CONSUMER CAMERA 2", "LENS", "GAIN", "PEDESTAL", "GAMMA", "DETAIL", "CAMERA PRESET", "FLARE", "SHADING", "KNEE", and "SHADOW". FIG. 23 illustrates the data structure of the pack "CONSUMER CAMERA 1". Bytes PC1 to PC4 of this pack include data pertaining to the iris information (IRIS), AE mode information, automatic gain mode information (AGC), white balance mode information (WB MODE), white balance information (WHITE BALANCE), focussing mode information (FCM) and focal point position information (FOCUS).

The iris information (IRIS) in the data pack "CONSUMER CAMERA 1", wherein the iris position=$2^{IP/8}$, is defined as follows:

0 to 3 Ch=IP;

3Dh=not more than F1.0;

3Eh=close; and

3Fh=no information.

The AE mode information (AE MODE) is defined as follows:

0=full automatic;

1=gain priority mode;

2=shutter priority mode;

3=iris priority mode;

4=manual;

Fh=no information; and

Other values=reserved.

The automatic gain control information (AGC) is defined as follows:

0 to Dh=G; and

Fh=no information, where the value of G=−3+G×3 dB.

The white balance mode data (WB MODE) is defined as follows:

0=automatic;

1=hold;

2=one push;

3=pre-set;

7=no information; and other values=reserved.

The white balance data (WHITE BALANCE) is defined as follows:

0=candle;

1=incandescent lamp;

2=low color temperature florescent lamp;

3=high color temperature florescent lamp;

4=sunlight;

5=cloudy weather;

Fh=no information; and other values=reserved.

The focusing mode information (FCM) is defined as follows:

0=automatic focusing; and

1=manual focusing.

The focal point information (FOCUS) is defined as follows:

0 to 7Eh=focal point position; and

7Eh=no information, where the focal point position=M×10$^L$ cm and M represents the upper order five bits of FOCUS and L represents the lower order two bits of FOCUS.

FIG. 24 illustrates the data structure of the pack "CONSUMER CAMERA 2". Bytes PC1 to PC4 include panning data pertaining to panning information in the vertical direction (VPD), panning speed in the vertical direction (V PANNING SPEED), hand deviation information (IS) and vertical distance information (FOCAL LENGTH).

Panning in the vertical direction (VPD) is defined as follows:

0=same direction as the vertical scanning direction; and

1=opposite direction to the vertical scanning direction.

The panning speed in the vertical direction is defined as follows:

0 to 1Dh=panning speed;

1Eh=not less than 29 lines per field; and

1Fh=no information.

Panning in the horizontal direction (HPD) is defined as follows:

0=same direction as the horizontal scanning direction; and

1=opposite direction to the horizontal scanning direction.

Panning speed in the horizontal direction (H PANNING SPEED) is defined as follows:

0 to 1Dh=PS;

3Eh=not less than 122 pixels per field; and

3Fh=no information, wherein the panning speed=2×PS and one pixel period=2/(13.5×10$^6$) second.

Hand deviation correction is defined as follows:

0=on; and

1=off.

Focal length is defined as follows:

[0096]

0–FEh=focal length;

3Dh=not more than F1.0; and

FFh=no information, where the focal length=M×10$^L$ cm and M represents the upper 7 bits of FOCAL LENGTH and L represents the LSB of FOCAL LENGTH.

The main areas in each of the above discussed video, audio and subcode areas of a track have stored therein auxiliary data which generally is common to all types of magnetic tapes. On the other hand, different optional auxiliary data may be stored in the optional areas, discussed above, by both tape manufacturers and/or users of consumer video tape recorders. Optional auxiliary data that is stored in the optional areas of a track may include character data, teletext signal data, television signal data, or any other data that is included in the vertical blanking interval of a television signal, as well as computer graphics data.

Figure 25:
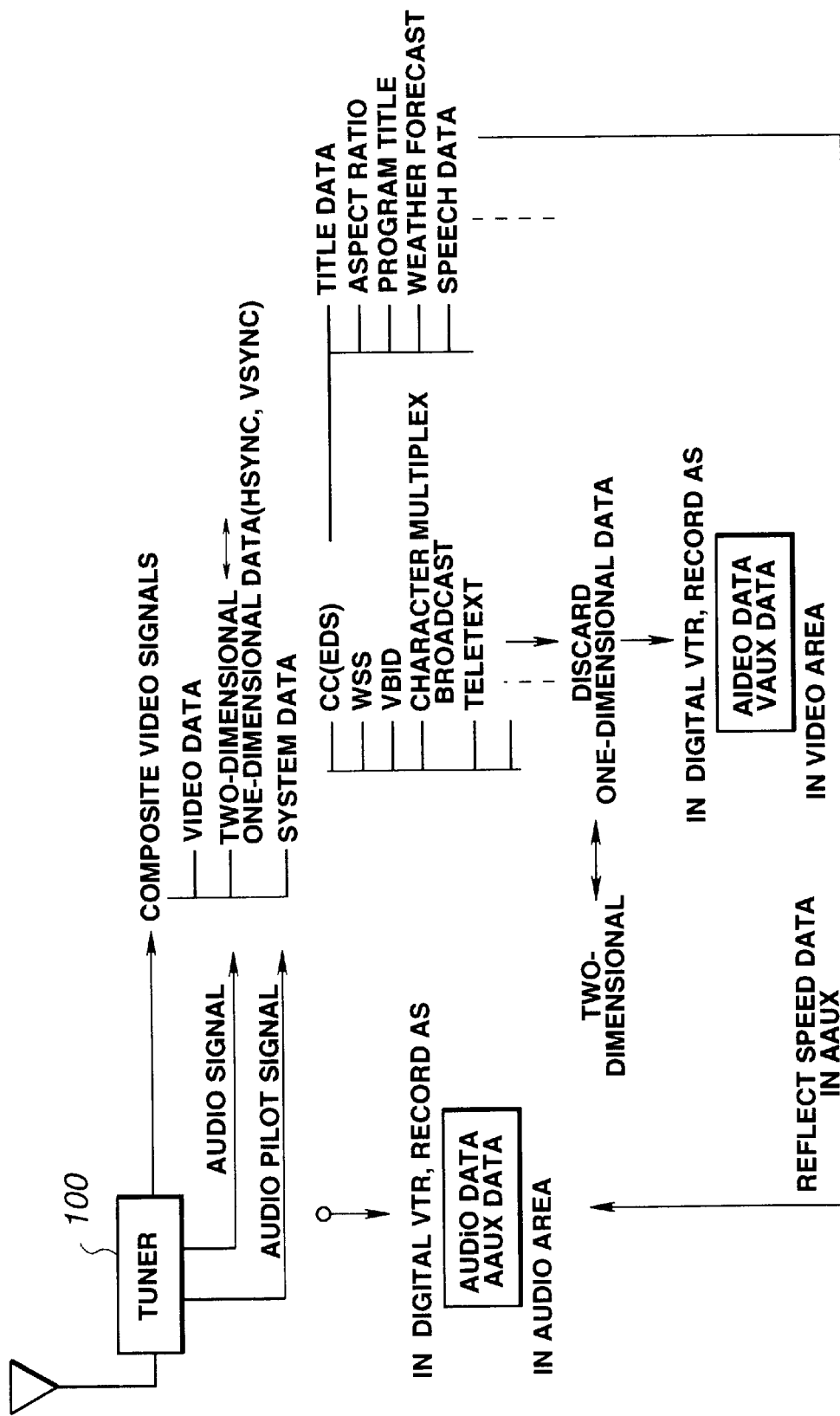
FIG. 25 is useful for explaining the operation of a television tuner.

FIG. 25 represents a television tuner in which a composite video signal having additional information in the vertical blanking intervals therein is received by a tuner 100. Tuner 100 separates the video, audio and audio pilot signals from the supplied signal. The composite video signal is comprised of picture data, two dimensional/one dimensional converting data (e.g., horizontal sync, video sync and vertical blanking signals), as well as system data. The system data includes closed caption (CC), ED, WSS and VBID data. The system data includes data pertaining to the video picture, as well as speech information.

In the digital video tape recorder, two dimensional/one dimensional conversion data, which includes therein system data, is removed from the video signal prior to being recorded on a magnetic tape. If the input signal is directly recorded and directly output when reproduced, a type of recording known as "transparent recording" is accomplished. However, transparent recording generally is not accomplished in digital video tape recorders.

FIG. 26 illustrates the various system data that is included in various types of video signals. It is seen that some of the information (e.g., character multiplexed signal and teletext data) cannot simply be recorded, without further processing thereof, in a digital format. Further, macrovision signals correspond to "copy guard" and, thus, cannot simply be recorded as is.

Figure 27:
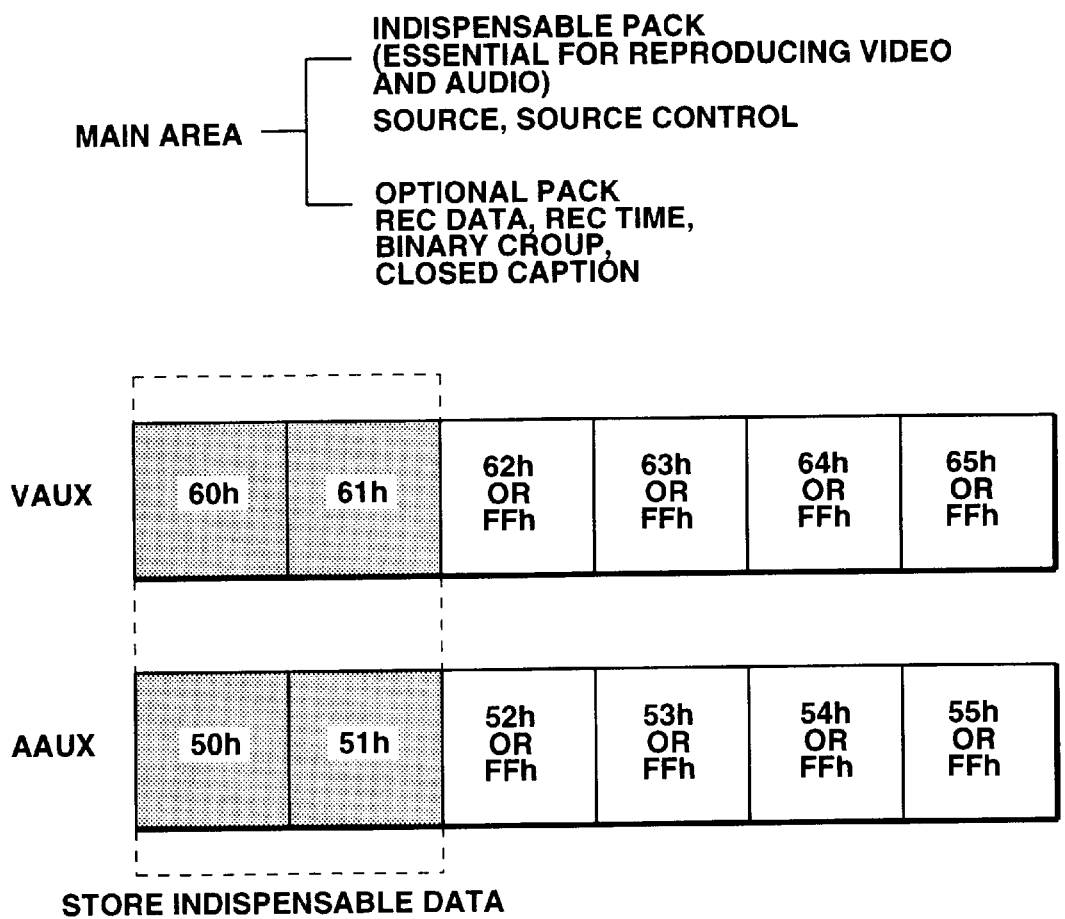
FIG. 27 is useful for explaining the video and audio auxiliary areas.

Referring next to FIG. 27, the particular types of data stored in the video auxiliary (VAUX) and audio auxiliary (AAUX) areas of a track are shown. As previously discussed, the VAUX area includes data packs having the item value (or header) of 60h to 65h, and the AAUX area of a track includes therein data packs having item values of 50h to 55h. The video and audio data packs "source" and "source control" having the header values of 60h, 61h, 50h and 51h, respectively, are known as "indispensable" data, whereas the video and audio data packs having headers of 62h–65h and 52h–55h optionally are stored in each of the tracks on the magnetic tape and no information packs having the item value of FFh may be stored in place of these data packs. Furthermore, the above-mentioned CC, EDS, VBID and/or WSS data may be transparently recorded using the closed caption packs having the header values of 65h and 55h as well as the transparent packs having the header values of 56h and 66h.

Figure 28:
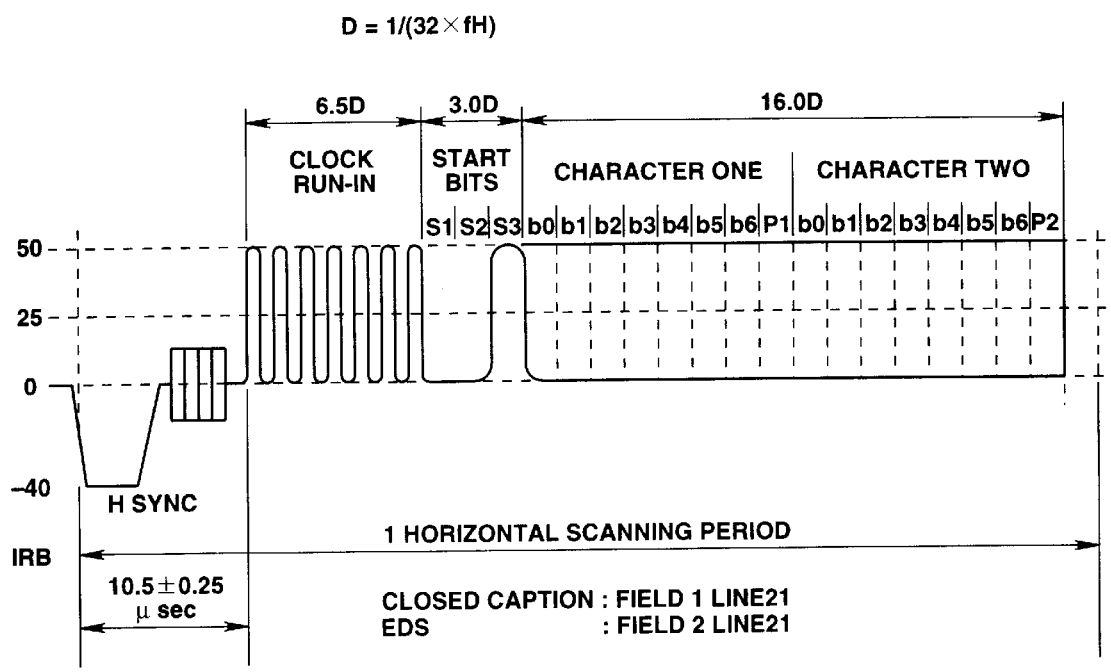
FIG. 28 is a waveform diagram of a closed caption signal.

FIG. 28 is a signal waveform diagram of a closed caption signal which is comprised of 6.5 cycles of a clock run-in signal followed by three start bits S1, S2 and S3, a first character data and a second character data. In accordance with the present invention, the first and second character data in the closed caption signal is stored in a VAUX closed caption pack which has the data structure shown in FIG. 17B, previously discussed. It is noted that closed caption signals generally are inserted in both the first and second fields of a video signal, but EDS signals may also sometimes be included in the second field of the video signal. That is, "raw" closed caption signals and raw EDS data may be stored in a single VAUX closed caption pack.

VAUX closed caption packs have the item value of 65h and are stored in the video auxiliary area of each track, as shown in FIG. 20. If the closed caption data is not included in the video signal, no information packs instead are stored at these locations. Referring back to FIG. 17B, the VAUX closed caption pack specifies that the data is to be inserted into the twenty-first line of a field and, thus, it is not necessary to specify this line in a "line" pack. When a digital video signal having closed caption data packs are reproduced from a record medium, the closed caption data automatically is inserted into the twenty-first line of a television signal by an appropriate decoder.

Figure 29:
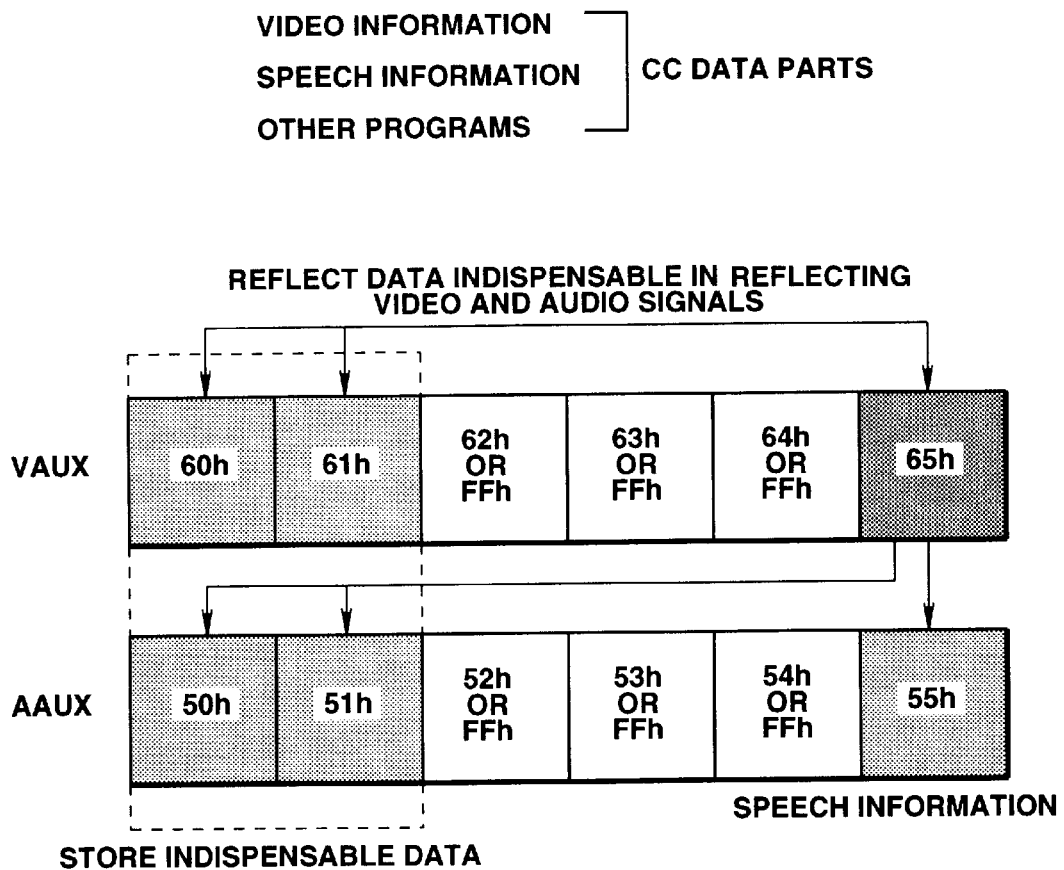
FIG. 29 is useful for explaining the insertion of a closed caption data pack in the video and audio auxiliary areas.

Referring next to FIG. 29, the closed caption data stored in the closed caption data packs having headers of 65h and 55h are deemed to be indispensable when closed caption signals are included in the television signals. One technique to determine whether a closed caption signal is included in a television signal is by detecting line 21 as a 32fH clock run-in signal 10.5 microseconds after the decay of the horizontal synchronization signal. If it does, the ensuing 16-bit data is extracted therefrom and the 16 bits of data, which is comprised of two 7-bit ascii codes, along with two parity bits, are stored as the upper and lower bites of the respective field in the VAUX closed caption data pack. It is contemplated that U.S. originated video signals recorded in digital format on a record medium are reproduced in Japan which generally does not process the closed caption signals. The VBID data, which includes aspect ratio information, is included in the closed caption data in the television signal and, thus, "indispensable" data in the closed caption signal is extracted therefrom and included in the indispensable data packs having the headers of 60h, 61h, 50h and 51h. Thus, aspect ratio data is included in a pack having a header of 61h so that televisions that do not process the closed caption data properly switch to the proper aspect ratio as identified by the VBID data.

Closed caption signals may include both indispensable and dispensable data and such data is stored in the VAUX closed caption pack. The indispensable data is stored in data packs having headers of 60h, 61h, 50h and 51h and thus are fully reproducible by televisions that are operable to decode the VAUX closed caption packs. In addition, televisions that are unable to decode the VAUX closed caption packs still can restore the closed caption signals to the twenty-first line of the television signal if it at least recognizes the existence of the VAUX closed caption data pack. Further, televisions that are unable to decode and are unable to recognize the existence of VAUX closed caption packs are still able to restore the vertical blanking information by utilizing the data from the packs having the headers of 60h, 61h, 50h and 51h and, thus, various types of televisions and/or video tape recorders are operable to utilize the closed caption data. The data structure of the audio auxiliary closed caption data pack has been previously discussed with reference to FIG. 16A. This data pack, which has a pack header of 55h, is stored at those locations in the audio auxiliary area of a track as shown in FIG. 18. Similar to the VAUX closed caption pack, data that is indispensable for reproducing speech signals is stored in the data packs having the headers of 50h and 51h. Thus, a television or video tape recorder that is unable to process the AAUX closed caption pack is still operable to process the indispensable data that is included in the packs having the headers of 50h and 51h.

Data concerning the audio is stored in the VAUX closed caption pack. However, this information also is stored in the audio area of a track so that the audio data (i.e., speech data) can be reproduced even if the VAUX closed caption packs cannot be reproduced. Thus, post-recording of video data in the video area of a track, which would result in the loss of the VAUX closed caption packs, does not cause the audio stored in the audio area of a track to be un-reproducible.

EDS data includes information regarding the particular language of the closed caption data as well as the language (i.e., words) themselves, as previously discussed with respect to FIG. 16A. FIG. 30 illustrates the relationship between the data stored in the AAUX closed caption pack and the audio mode data stored in the AAUX source pack. As shown, the various types of audio data as well as the locations of the information are reflected in the stored data.

Figure 31:
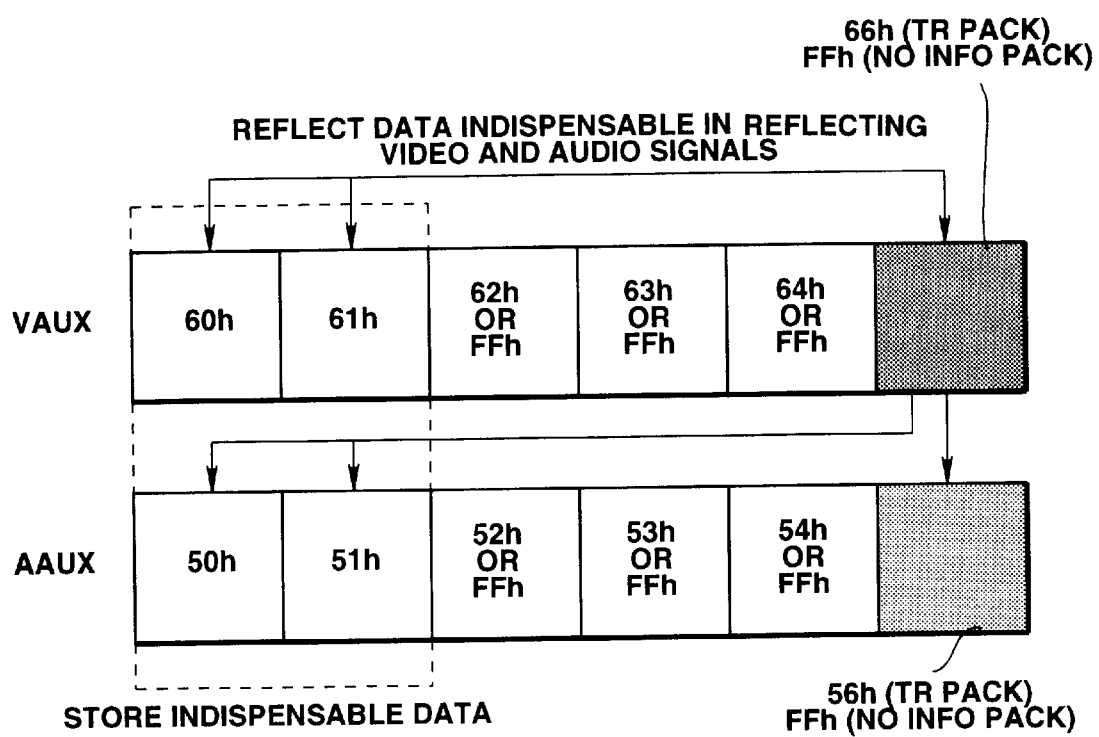
FIG. 31 is useful for explaining the insertion of a transparent (TR) data pack in the VAUX and AAUX areas.
Figure 33:
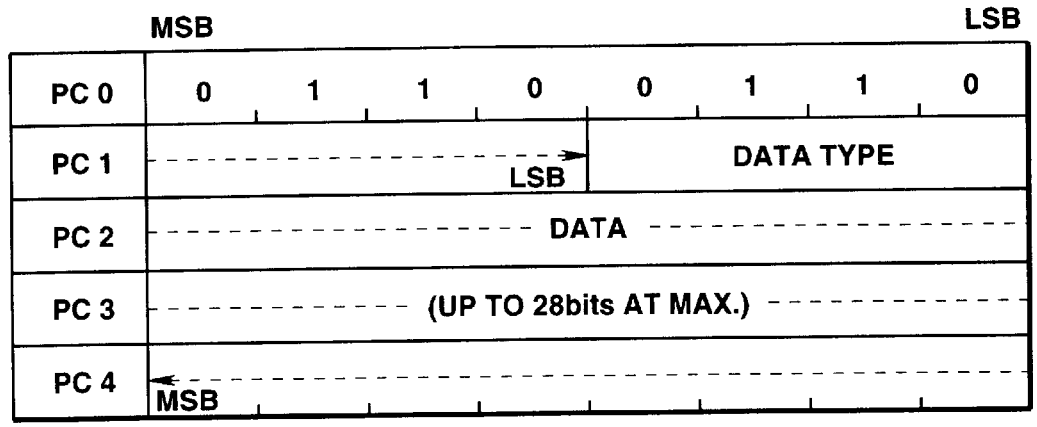
FIG. 33 illustrates the data structure of the video auxiliary TR data pack.
Figure 35:
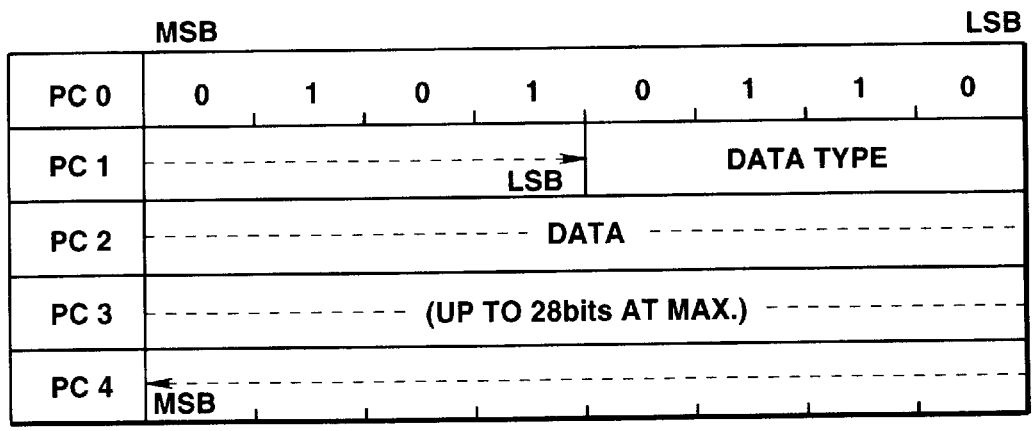
FIG. 35 illustrates the data structure of the audio auxiliary TR pack.

The VBID, WSS and vertical blanking data are stored in the VAUX and AAUX transparent packs, and which have the data structure as shown in FIGS. 33 and 35, respectively (to be discussed). The VAUX transparent pack, which has the pack header of 66h, and the AAUX transparent pack, which has the pack header of 56h, are stored in the positions as shown in FIG. 31. These packs are stored at the same location as the closed caption packs, and depending on whether a video tape recorder is adapted to process a transparent pack, either only closed caption packs or both closed caption packs and transparent packs are stored in the digital data in the manner shown in FIG. 32A. FIG. 32B identifies the process of a video tape recorder that is adapted to process a transparent pack as well as a video tape recorder that is not adapted to process a transparent pack. Referring next to FIG. 33, the data structure of a VAUX transparent pack is shown. This data pack includes four DATA TYPE bits which identify the type of data stored in the transparent pack. The data type may specify the data as VBID data, WSS data, EDTV2 data, as well as to future types of data (e.g., X field 1, X field 2) in which different types of data are stored in the different fields of each frame. A maximum of twenty-eight bits are stored in the VAUX transparent pack and, as shown in FIG. 26, such is possible with clock rates that are less than 1 MHz. FIG. 34A illustrates a transparent pack having VBID data stored therein and FIG. 34B illustrates a transparent pack having WSS data stored therein.

FIG. 35 illustrates the data structure of an AAUX transparent pack which, as shown, has a data structure similar to the data structure of the VAUX transparent pack. In addition, since VBID, WSS and EDTV2 data do not include audio data, the data types of 0000, 0001 and 0010 are not assigned. In this case, "no information" packs may be utilized. Further, it is preferable to keep the assignment of the data types of the VAUX transparent pack and the AAUX transparent pack the same so as to prevent processing of such information from becoming complex.

Referring back to FIGS. 18 and 20, the structure of the audio and video auxiliary areas in each of ten tracks are shown. It is seen that each track includes the same pack contents, and if the closed caption pack is written in at least the last pair of tracks (e.g., tracks 9 and 10), a transparent pack "picks" the closed caption pack even in the event that a magnetic tape which includes only the necessary closed caption packs in each of the ten tracks.

Figure 36:
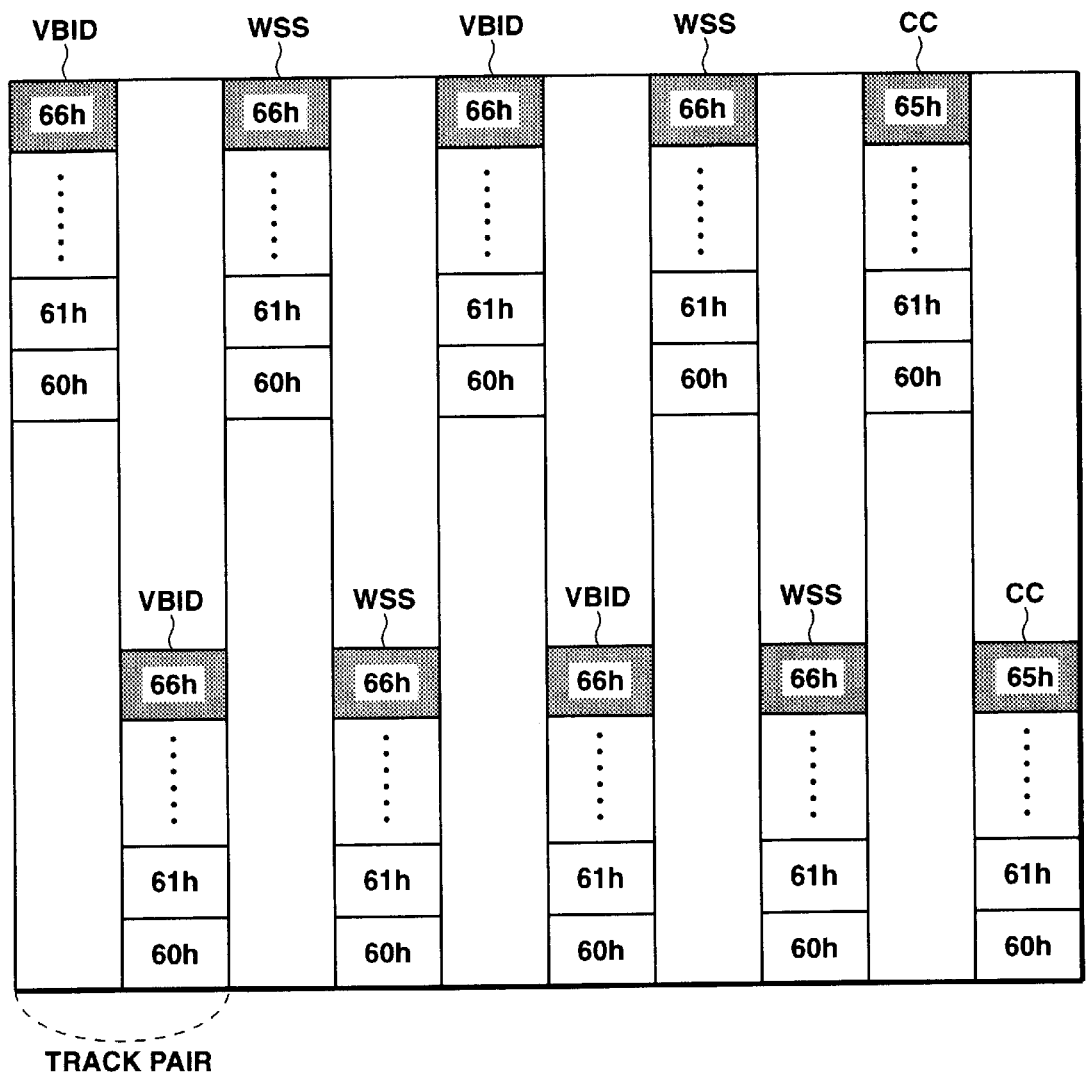
FIG. 36 schematically illustrates the data structure of tracks having CC, VBID and WSS data therein.

FIG. 36 illustrates the data structure of ten successive tracks which include therein VBID, WSS and closed caption data. Video tape recorders that are operable only to process the closed caption and VBID data, for example, then only the closed caption and VBID data is reproduced and processed which provides this data at predetermined positions in the vertical blanking interval of a video signal. WSS data, however, may be reproduced from the data packs having the pack headers of 60h and 61h and thus will be superimposed at predetermined positions in the vertical blanking period of the video signal. The data structure of the audio auxiliary area, regarding the audio auxiliary transparent pack and closed caption pack, is similar to the video auxiliary area and, thus, description thereof is omitted herein.

Figure 37:
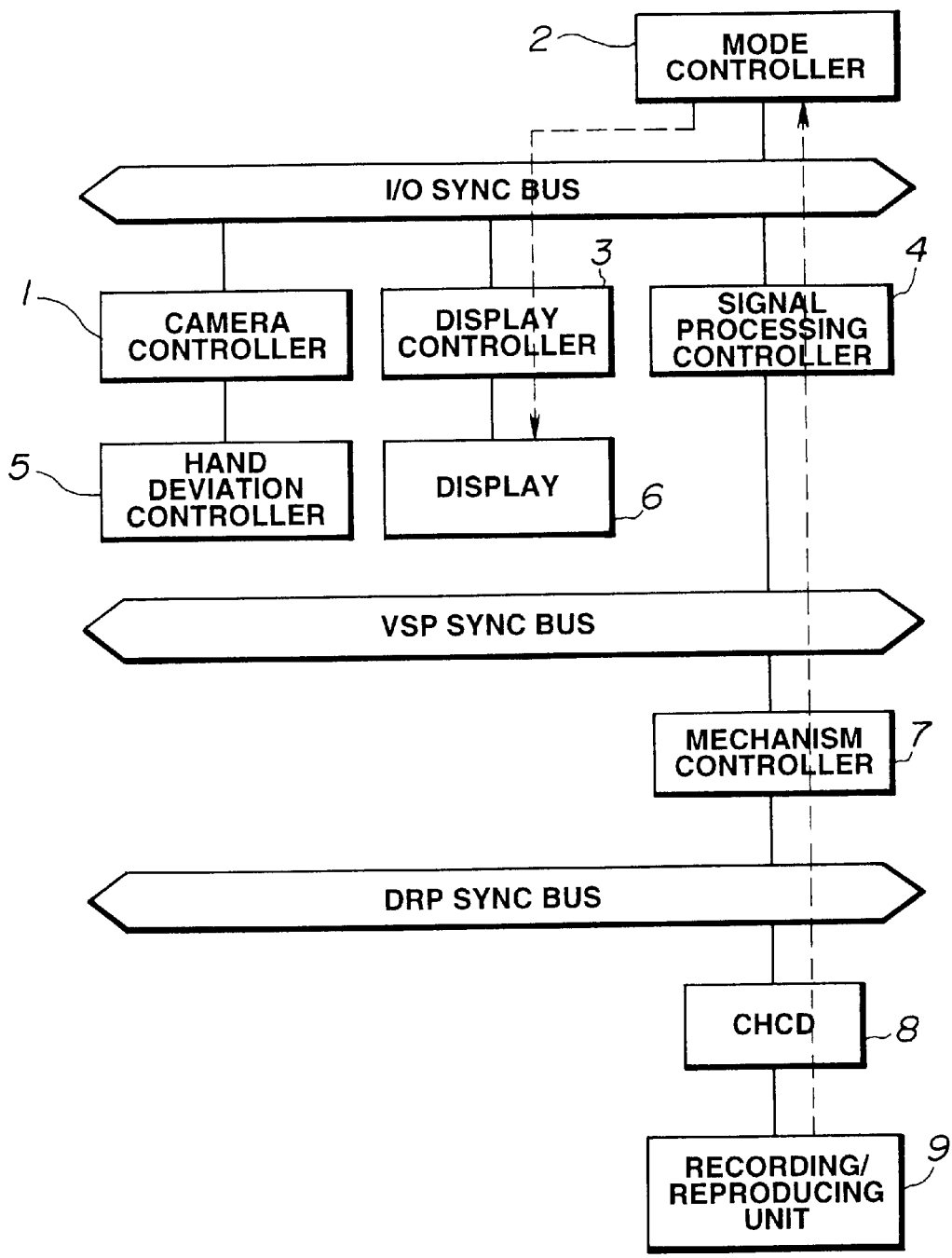
FIG. 37 is a block diagram of the apparatus of the present invention showing the flow of camera setting data during a reproducing operation.
Figure 38:
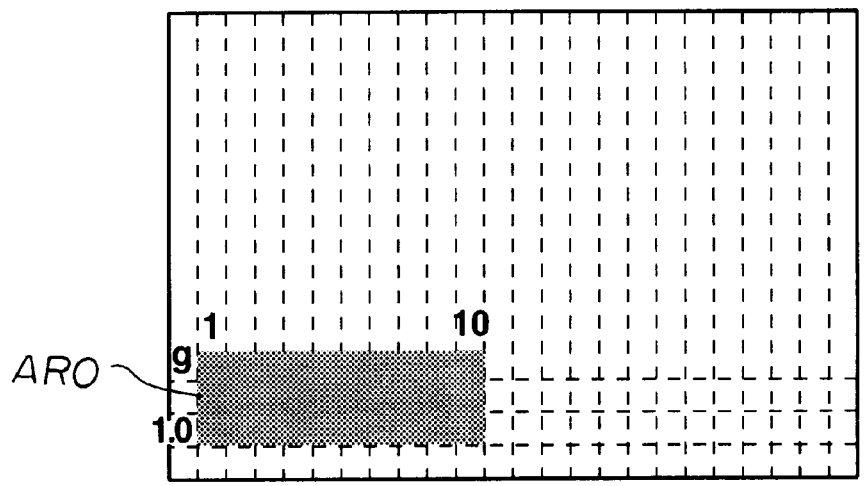
FIG. 38 schematically illustrates an on-screen display during a reproducing operation of the apparatus of the present invention.
Figure 39:
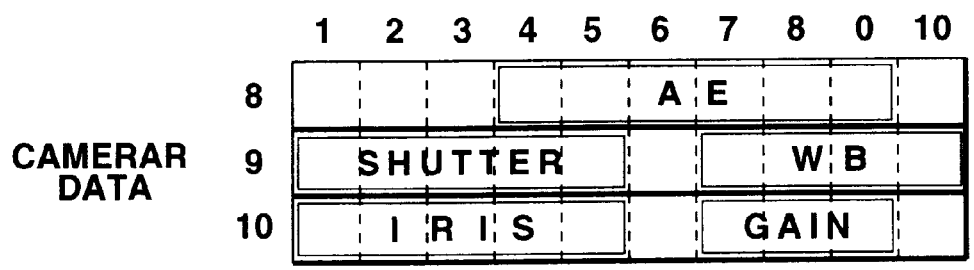
FIG. 39 schematically illustrates the display of the various camera control settings.

As previously discussed with reference to FIGS. 1 and 2, the camera/video tape recorder of the present invention generates camera setting data which represent the various settings of the camera during imaging of a video image and stores the video signal along with the camera setting data on a magnetic tape. The camera setting data, in accordance with the present invention, are the data packs "consumer camera 1", "consumer camera 2", "lens", "gain", "pedestal", "gamma", "detail", "camera preset", "flare", "shading", "knee", and/or "shutter". The data structure of the consumer camera 1 and consumer camera 2 packs have been previously discussed and are shown in FIGS. 23 and 24, respectively. In addition, date and time data regarding the date and time at which the video signal was produced (i.e., when the picture was taken) is stored in the REC date and REC time packs, or the binary group pack. These data packs are stored in the auxiliary data areas of a track, previously discussed. FIG. 37 is a block diagram of apparatus for recording and reproducing a video signal with camera setting data in accordance with the present invention in which the flow of reproduced camera setting data from the recording/reproducing unit 9 to the display 6 is shown. During a reproduction operation, recording/reproducing unit 9 reproduces the video signal and camera setting data from a magnetic tape and supplies the reproduced camera setting data via the various circuits to mode controller 2 which converts the supplied camera setting data into "display" data and which supplies the display data to display controller 3. Mode controller 2 is responsive to user commands to determine whether the display data is to be output in either a first output configuration or a second output configuration. Display controller 3 supplies appropriate control signals to display 6 so that display 6 displays the various camera setting data and/or time and date data on a predetermined specified display area AR0 shown in FIG. 38, or on a separate LCD display on the camera body. FIG. 39 illustrates the structure of area AR0 and, as shown, the particular AE mode is shown, and information regarding the shutter speed, the white balance gain, the iris setting and the gain information are shown. FIGS. 40A to 40E illustrate different displays of the camera of the present invention corresponding to whether there is any hand deviation (i.e., user control), the particular AE mode, the shutter speed, the iris setting, the white balance (WB) setting and the iris/gain settings, as shown in FIGS. 40A, 40B, 40C, 40D and 40E, respectively.

By using the data shown in the apparatus' display, or in a reproducing apparatus which reproduces the video signal and camera setting data, the video signal can be processed accordingly, that is, the video signal can be processed and/or developed automatically or manually by a user in accordance with the various camera setting data that is displayed therewith.

While the present invention has been particularly described in conjunction with preferred embodiments thereof, it will be readily appreciated by those of ordinary skill in the art that various changes may be made without departing from the spirit and scope of the invention. For example, although the present invention has been shown and described as recording and reproducing camera setting data including hand deviation correction data, AE mode data, shutter speed, iris setting, WB data and gain data, the present invention is not limited solely to these types of camera settings and may record and reproduce other types of camera settings, even those that are not currently in use.

As another example, although the present discussion is directed to a particular type of recording format, the present invention is not limited to this format and may be widely applied to other recording formats as well as to other types of recording mediums, including, but not limited to, magnetic tapes, magneto-optical disks, optical disks, computer random access memories, etc.

Therefore, it is intended that the appended claims be interpreted as including the embodiments described herein, the alternative mentioned above, and all equivalents thereto.

What is claimed is:

1. An apparatus for recording and reproducing a video signal with camera setting data on a record medium, comprising:

means for establishing various camera settings in preparation of imaging a video image;

imaging means for imaging the video image to produce a video signal representing the video image;

means for generating camera setting data identifying the various camera settings established for imaging the video image;

recording means for recording the video signal in a first location of a record medium and for recording the camera setting data in a second location of the record medium separate from the first location;

means for modifying at least one parameter of said video signal read from said first location of said record medium in accordance with at least said camera setting data read from said second location of said record medium;

mode control means for converting the camera setting data into display data and determining whether the display data is to be output in either a first output configuration or a second output configuration in accordance with user commands; and display control means for controlling the display of said display data.

2. The apparatus of claim 1, further comprising means for generating date and time data representing a date and time at which the video image is imaged; and wherein said recording means is operable to record the date and time data on said record medium.

3. The apparatus of claim 1, wherein the record medium is comprised of successive tracks each including a video data area and a video auxiliary area; and said recording means records the video signal in the video data area and records the camera setting data in the video auxiliary area.

4. The apparatus of claim 3, wherein said recording means records the camera setting data in a common pack structure in the video auxiliary area of each track on the record medium.

5. The apparatus of claim 1, wherein said means for establishing is operable to establish an iris setting and a shutter speed of the apparatus, and said means for generating is operable to generate camera setting data identifying the established iris setting and shutter speed.

6. The apparatus of claim 1, wherein said means for establishing is operable to establish a white balance mode and a focusing mode of the apparatus, and said means for generating is operable to generate camera setting data identifying the established white balance mode and focusing mode.

7. The apparatus of claim 1, wherein said means for establishing is operable to establish a vertical panning speed and a horizontal panning speed of the apparatus, and said means for generating is operable to generate camera setting data identifying the established vertical panning speed and horizontal panning speed.

8. The apparatus of claim 1, wherein said means for generating is operable to generate said camera setting data including hand deviation data and vertical distance data representing manual control and a distance of the camera from the video image, respectively.

9. The apparatus of claim 1, wherein said imaging means is a camera.

10. An apparatus for reproducing a video signal and camera setting data from a record medium, comprising:

reproducing means for reproducing from a record medium a video signal representing a video image imaged by a camera and camera setting data identifying various states of the camera during imaging of the video image;

means for generating display data from the reproduced camera setting data;

means for modifying, in accordance with user instructions and the generated display data, at least one parameter of the reproduced video signal to produce a modified video signal;

mode control means for determining whether the display data is to be output in either a first output configuration or a second output configuration in accordance with user commands;

display control means for controlling the display of said display data; and means for outputting the modified reproduced video signal and the display data.

11. The apparatus of claim 10, wherein said reproducing means is operable to reproduce from said record medium date and time data along with said video signal and said camera setting data, said date and time data representing a date and time at which the video image is imaged; and wherein said outputting means outputs said date and time data.

12. The apparatus of claim 10, wherein said reproducing means is operable to reproduce the video signal from a video data area and the camera setting data from a video auxiliary area of each track on said record medium.

13. The apparatus of claim 12, wherein the camera setting data is stored as common packs in a common pack structure in the video auxiliary area of each track on the record medium; and said reproducing means is operable to reproduce the common packs having the common pack structure from the video auxiliary areas.

14. The apparatus of claim 10, wherein said reproducing means is operable to reproduce camera setting data identifying an iris setting, a shutter speed, a white balance mode and a focusing mode representing a state of an imaging apparatus during imaging of the video image.

15. The apparatus of claim 14, further comprising means for displaying the reproduced iris setting, shutter speed, white balance mode and focusing mode to a user.

16. The apparatus of claim 10, wherein said reproducing means is operable to reproduce camera setting data identifying a vertical panning speed, a horizontal panning speed, hand deviation data and vertical distance data representing a state of an imaging apparatus during panning imaging of the video image.

17. An apparatus for recording and reproducing a video signal with camera setting data to and from a record medium, comprising:

means for establishing various camera settings in preparation of imaging a video image;

means for imaging the video image to produce a video signal representing the video image;

means for generating camera setting data identifying the various camera settings established for imaging the video image;

recording means for recording the video signal in a first location of a record medium and for recording the camera setting data in a second location of the record medium separate from the first location;

reproducing means for reproducing said video signal and said camera setting data from said record medium;

means for modifying at least one parameter of said video signal in accordance with said reproduced camera setting data;

mode control means for converting the camera setting data into display data and determining whether the display data is to be output in either a first output configuration or a second output configuration in accordance with user commands;

display control means for controlling the display of said display data; and means for outputting the modified reproduced video signal and the display data.

18. A method of recording and reproducing a video signal with camera setting data on a record medium, comprising the steps of:

establishing various camera settings in preparation of imaging a video image;

imaging the video image to produce a video signal representing the video image;

generating camera setting data identifying the various camera settings established for imaging the video image;

recording the video signal in a first location of a record medium and the camera setting data in a second location of the record medium separate from the first location;

modifying at least one parameter of said video signal read from said first location of said record medium in accordance with at least said camera setting data read from said second location of said record medium;

converting the camera setting data into display data;

determining whether the display data is to be output in either a first output configuration or a second output configuration in accordance with user commands; and controlling the display of said display data.

19. The method of claim 18, further comprising the step of generating date and time data representing a date and time at which the video image is imaged; and wherein said recording step is carried out by recording the video signal, the camera setting data, and the date and time data on the record medium.

20. The method of claim 18, wherein the record medium is comprised of successive tracks each including a video data area and a video auxiliary area; and said recording step is carried out by recording the video signal in the video data area and recording the camera setting data in the video auxiliary area.

21. The method of claim 20, wherein said recording step is carried out by recording the camera setting data in a common pack structure in the video auxiliary area of each track on the record medium.

22. The method of claim 18, wherein said step of establishing is carried out by establishing an iris setting and a shutter speed of an imaging device, and said step of generating is carried out by generating camera setting data identifying the established iris setting and shutter speed.

23. The method of claim 18, wherein said step of establishing is carried out by establishing a white balance mode and a focusing mode of an imaging device, and said step of generating is carried out by generating camera setting data identifying the established white balance mode and focusing mode.

24. The method of claim 18, wherein said step of establishing is carried out by establishing a vertical panning speed and a horizontal panning speed of an imaging device, and said step of generating is carried out by generating camera setting data identifying the established vertical panning speed and horizontal panning speed.

25. The method of claim 18, wherein said step of generating is carried out by generating said camera setting data including hand deviation data and vertical distance data representing manual control and a distance of the camera from the video image during imaging, respectively.

26. A method of reproducing a video signal and camera setting data from a record medium, comprising the steps of:

reproducing from a record medium a video signal representing a video image imaged by a camera and camera setting data identifying various states of the camera during imaging of the video image;

generating display data from the reproduced camera setting data;

determining whether the display data is to be output in either a first output configuration or second output in accordance with user commands;

modifying, in accordance with user instructions and the displayed generated display data, at least one parameter of the reproduced video signal to produce a modified video signal; and outputting the modified reproduced video signal and the display data.

27. The method of claim 26, wherein said reproducing step is carried out by reproducing from said record medium date and time data along with said video signal and said camera setting data, said date and time data representing a date and time at which the video image is imaged; and further comprising the step of outputting the reproduced date and time data.

28. The method of claim 26, wherein said reproducing step is carried out by reproducing the video signal from a video data area and the camera setting data from a video auxiliary area of each track on said record medium.

29. The method of claim 28, wherein the camera setting data is stored as common packs in a common pack structure in the video auxiliary area of each track on the record medium; and said reproducing step is carried out by reproducing the common packs having the common pack structure from the video auxiliary areas.

30. The method of claim 26, wherein said reproducing step is carried out by reproducing camera setting data identifying an iris setting, a shutter speed, a white balance mode and a focusing mode representing a state of an imaging apparatus during imaging of the video image.

31. The method of claim 30, further comprising the step of displaying the reproduced iris setting, shutter speed, white balance mode and focusing mode to a user.

32. The method of claim 26, wherein said reproducing step is carried out by reproducing camera setting data identifying a vertical panning speed, a horizontal panning speed, hand deviation data and vertical distance data representing a state of an imaging apparatus during panning imaging of the video image.

33. A method of recording and reproducing a video signal with camera setting data to and from a record medium, comprising the steps of:

establishing various camera settings in preparation of imaging a video image;

imaging the video image to produce a video signal representing the video image;

generating camera setting data identifying the various camera settings established for imaging the video image;

recording the video signal in a first location of a record medium and the camera setting data in a second location of the record medium separate from the first location;

reproducing said video signal and said camera setting data from said record;

converting the camera setting data into display data and determining whether the display data is to be output in either a first output configuration or a second output configuration in accordance with user commands;

modifying at least one parameter of said video signal in accordance with said reproduced camera setting data;

controlling the display of said display data; and outputting the modified reproduced video signal and the generated display data.

* * * * *